US012125215B1

(12) United States Patent
Shree et al.

(10) Patent No.: US 12,125,215 B1
(45) Date of Patent: Oct. 22, 2024

(54) STEREO VISION SYSTEM AND METHOD FOR SMALL-OBJECT DETECTION AND TRACKING IN REAL TIME

(71) Applicant: NODAR Inc., Somerville, MA (US)

(72) Inventors: Vikram Shree, Cambridge, MA (US); Leaf Alden Jiang, Concord, MA (US); Piotr Swierczynski, Berlin (DE)

(73) Assignee: NODAR Inc., Somerville, MA (US)

( * ) Notice: Subject to any disclaimer, the term of this patent is extended or adjusted under 35 U.S.C. 154(b) by 0 days.

(21) Appl. No.: 18/678,781

(22) Filed: May 30, 2024

Related U.S. Application Data

(60) Provisional application No. 63/578,821, filed on Aug. 25, 2023.

(51) Int. Cl.
  *G06T 7/20*   (2017.01)
  *G06T 5/70*   (2024.01)
  *G06T 17/00*  (2006.01)
  *G06V 20/56*  (2022.01)

(52) U.S. Cl.
  CPC .............. *G06T 7/20* (2013.01); *G06T 5/70* (2024.01); *G06T 17/00* (2013.01); *G06V 20/56* (2022.01); *G06V 2201/07* (2022.01)

(58) Field of Classification Search
  CPC .. G06T 7/20; G06T 20/56; G06T 5/70; G06T 17/00
  See application file for complete search history.

(56) References Cited

U.S. PATENT DOCUMENTS

2022/0198198 A1\* 6/2022 Marcotte ............ G01C 21/3822

OTHER PUBLICATIONS

Breitenstein et al., Robust Tracking-by-Detection using a Detector Confidence Particle Filter. IEEE, 12th International Conference on Computer Vision (ICCV). Sep. 29, 2009:1515-22.
Nuss et al., A Random Finite Set Approach for Dynamic Occupancy Grid Maps with Real-Time Application. Arxiv:1605.02406v2, Sep. 10, 2016;20 pages.

(Continued)

*Primary Examiner* — Sam Bhattacharya
(74) *Attorney, Agent, or Firm* — Wolf, Greenfield & Sacks, P.C.

(57) ABSTRACT

A method of detecting and tracking objects includes (a) obtaining point-cloud data captured by camera sensors on a vehicle travelling along a road surface, (b) compressing the point-cloud data to bird's-eye-view (BEV) data representing a view along a BEV direction oriented approximately perpendicular to the road surface, the BEV data representing the objects on a BEV plane oriented approximately parallel the road surface, (c) establishing a grid of cells for the BEV plane, (d) for each cell, determining occupancy values of the cell for a time $t_n$ and performing noise reduction by assigning weights to the cell based on predicted occupancy values of the cell for the time $t_n$ and on occupancy values of the cell for a previous time $t_{n-1}$, and (e) outputting to a controller of the vehicle, in real time or nearly real time, an occupancy evidence map of objects in the vehicle's environment.

24 Claims, 14 Drawing Sheets
(7 of 14 Drawing Sheet(s) Filed in Color)

(56) References Cited

OTHER PUBLICATIONS

Toyama et al., Probabilistic Tracking in a Metric Space. IEEE International Conference on Computer Vision (ICCV). Jul. 7, 2001;2:50-7.

Yan et al., Learning Spatio-Temporal Transformer for Visual Tracking. IEEE/CVF international conference on computer vision (ICCV). 2021:10448-57.

\* cited by examiner

STEREO VISION SYSTEM AND METHOD FOR SMALL-OBJECT DETECTION AND TRACKING IN REAL TIME

CROSS-REFERENCE TO RELATED APPLICATIONS

The present application claims the benefit of priority of U.S. Provisional Application No. 63/578,821 filed Aug. 25, 2023, entitled "STEREO VISION SYSTEM AND METHOD FOR SMALL-OBJECT DETECTION AND TRACKING IN REAL TIME," the entire contents of which is incorporated by reference herein.

FIELD OF THE INVENTION

The present technology relates to systems that detect and track objects in real time or nearly real time using three-dimensional (3D) image data. In particular, the present technology relates to techniques for detecting objects relative to a vehicle and efficiently estimating positions of the objects relative to the vehicle in real time or nearly real time using image data of images captured by sensors on the vehicle. Such techniques may be applicable to vision systems on board autonomous vehicles and/or driver-assistance systems on board vehicles with drivers.

BACKGROUND 3D vision systems have become more and more widely used in industries where sight or vision is required for machinery to move in an unconstrained environment (e.g., at the speed limit on an interstate highway; at a crosswalk near pedestrians and vehicles; in a collapsed building; in a forest; etc.) to assist humans or, in some cases, to operate where humans may not be present. In one example, stereo vision systems may be part of autonomous robots deployed in search-and-rescue operations to assist humans perceive stationary structures and/or moving objects in areas where it may be dangerous for a human to be present. In another example, stereo vision systems may be part of autonomous vehicles (e.g., trucks, automobiles, drones, etc.) to "see" or perceive nearby terrain and objects near and far (e.g., landmarks, road signs, other vehicles in traffic, etc.) in lieu of human eyes and to provide data to other onboard electronic systems that control movement of the vehicles. In yet another example, stereo vision systems may be used to assist drivers of vehicles to perceive upcoming hazards and warn the drivers to take action to avoid the hazards.

In order for 3D vision systems to be used to operate autonomous moving machines (e.g., autonomous robots, autonomous vehicles, etc.) safely, and/or to aid in safe operation of driver-assisted vehicles, it is desirable for the 3D vision systems to provide vision information that is reliable and accurate. Additionally, to allow sufficient time for autonomous moving machines to react safely in response to the vision information, and/or for drivers to take appropriate action to a warning resulting from the vision information, it is desirable for the vision information to be provided to control systems of the autonomous moving machines, and/or to monitoring systems of driver-assisted vehicles, in real time or nearly real time. For example, it is desirable for range or depth estimates determined by a vision system to be accurate and reliable, so that a control system of an autonomous vehicle may use the estimates to detect an upcoming road hazard and cause the vehicle to move to avoid the hazard. Such estimates may not be useful if they cannot be processed in time to permit the vehicle to be controlled to move safely to avoid the hazard. Therefore, it is particularly desirable for such estimates to be determined accurately and in real time or nearly real time in order for the vehicle, which may be moving at typical speed limits on an interstate highway, to have sufficient time to move safely to avoid the hazard.

Stereo vision systems typically use two cameras (e.g., left and right cameras) to produce 3D information of a scene captured by the cameras. The 3D information may include a two-dimensional (2D) image of the scene, based on a pair of images captured by the cameras, and an estimate of distance for each pixel of the 2D image. The distance may be estimated by measuring a disparity or parallax between matched pixels in a left image captured by the left camera and a right image captured by the right camera simultaneously with the left image. As used herein, the terms "camera sensor" and "camera" may be used interchangeably to refer to a device configured to capture a 2D image of a scene. For example, U.S. Pat. No. 8,208,716 discloses a stereo vision system and a method that outputs a disparity map, which is a 2D matrix that contains pixel-shift data corresponding to a rectified image captured by one of the cameras (e.g., the left camera). An estimate of depth for each pixel of the image, corresponding to a distance from the camera to a portion of the scene in the pixel, may be computed from the disparity map because the depth of the pixel is inversely proportional to the disparity of the pixel. As such, the terms "depth map" and "disparity map" may be used interchangeably herein, because they provide very similar information about the scene of the image.

An advantageous aspect of stereo vision systems is that camera-sensor technology has advanced to such a degree that high-resolution camera sensors, which may have pixel counts in a range from 5 megapixels (MP) to 15 MP or greater, have a reasonably inexpensive price point (e.g., approximately US$50 or less). In contrast, alternative types of sensor technologies, such as lidar technology and radar technology, typically do not provide such high resolution and therefore may not provide sufficient information for use in identifying small objects at long distances, such as objects having a dimension of about 10 cm or smaller at distances of about 50 m or farther from the sensor. That is, due to the relative sparseness of points in lidar point clouds, and even sparser points in radar point clouds, especially at distances of 50 m or more, the probability of lidar waves or radio waves reflecting from small objects may not be sufficiently high for such waves to be useful for detecting small objects, much less for tracking movement of small objects over time. On the other hand, a high pixel count requires a large amount of high-speed processing to be able to process the voluminous pixel data and output results in real time or nearly real time.

SUMMARY

A perception system that is able to capture an image of a scene and to provide image data useable to detect objects in the scene and to track relative movement of the objects is of utmost importance for controlling an autonomous vehicle to move safely. Without a human on board to control the vehicle, the perception system may serve as the vehicle's eyes. As such, the perception system may be considered a vision system of the vehicle. For a vehicle in which there is a human driver, a vision system may be used to augment the driver's vision, such as to assist in "seeing" road debris, pedestrians, buildings, road signs, other vehicles, etc., both near to and far from the vehicle.

A desirable characteristic of image data captured by a vision system is that the image data have sufficient detail to permit small objects to be detected accurately and reliably. Another desirable characteristic of image data captured by a vision system is that image data be captured periodically, in a sequence, to permit small objects to be tracked over time. The image capture rate should be sufficiently high to permit accurate and smooth tracking of small objects when the vehicle is moving fast, such as at typical highway speed limits.

Typical object detection may entail determining an object's precise position in a 3D world and, in some cases, also determining the object's velocity in the 3D world. Imaging sensors can provide a 3D scan of a scene or an environment in front of the sensors and therefore are well suited for object detection for sensors mounted on vehicles. Such sensors include lidar sensors, radar sensors, camera sensors, to name a few. As noted above, a beneficial aspect of using camera sensors, compared to lidar sensors and radar sensors, is that high-pixel-count camera sensors are readily available at a reasonable cost. Also noted above is a key concern: High pixel counts require a great deal of computational resources to process the pixel data quickly, to produce results in real time or nearly real time. This is especially a concern when processing video data captured at high frame rates of 30 frames per second (FPS) or higher. For brevity, the term "real-time" may be used herein in lieu of the phrase "real time or nearly real time."

The inventors of the present technology disclosed herein have recognized a further concern with using high-resolution video data to detect and track objects in the scene in front of imaging sensors: imaging noise. As resolution becomes higher and higher and pixel size becomes smaller and smaller, a small imaging perturbation may result in a pixel discrepancy that may falsely appear as a small object in the imaged scene. These false objects or false positives may decrease the reliability of the image data by causing unnecessary evasive measures to be taken to avoid the false objects and, in some instances, may cause the vehicle to be controlled in a hazardous manner, such as to swerve and/or to brake abruptly to avoid the false objects. Imaging noise may arise for a variety of reasons, including but not limited to: poor or low lighting conditions; shiny or reflective surfaces, sun glare, airborne objects (e.g., gnats, flies, floating dandelion seeds, blowing leaves, etc.), and the like.

In view of challenges such as false positives from imaging noise and computational burdens imposed by the large volume of data associated with processing high-resolution imaging data for real-time object detection and tracking, the inventors have developed techniques, disclosed herein, that may be used to process high-resolution image data from a video feed with a reduced rate of false positives caused by imaging noise, sufficient to produce reliable real-time results. The inventors have recognized and appreciated that a parallelizable approach would be advantageous to save processing time, thus facilitating real-time results, and have developed techniques, disclosed herein, that utilize parallel processing. The inventors also have developed techniques, disclosed herein, that leverage a reduction in dimensionality to reduce the computational burden of processing high-resolution imaging data, without an appreciable loss in imaging detail. The techniques disclosed herein may be used to facilitate real-time detection and tracking of objects having dimensions as small as 15 cm even at a range or distance of about 200 meters from the vehicle, or objects having dimensions as small as 12 cm at a range or distance of about 170 meters from the vehicle, or objects having dimensions as small as 10 cm at a range or distance of about 150 meters from the vehicle. Such detection may be performed in real time using 5-MP cameras sensors capturing images at 15 FPS. In some aspects of the disclosed techniques, a tracking layer based on particle filtering may be used to filter out noise in the image data from video captured by camera sensors, by accounting for a temporal component of the image data across multiple frames of the video. In some aspects, a throughput of the disclosed techniques may scale linearly with an intended distance range of the camera sensors, which may result in a trade-off between a detection precision of objects of a particular minimum size or larger versus computational requirements to detect such objects. When tested on an Nvidia A5500 GPU, an object detection process may run at 30 FPS with a range of up to 200 meters.

In the context of movement control for an autonomous vehicle, a high-level understanding of a scene in the vehicle's travel path may be desirable to provide adequate time to plan steering movements and make decisions for a safe trip to a desired destination. Decisions such as lane changes to move around a traffic cone and/or to avoid an upcoming stalled vehicle, in-lane position maneuvers to avoid potholes, right-of-way yielding to ambulances and patrol vehicles, etc., may be required throughout the trip. For example, road debris in the vehicle's travel lane on a highway may be detected by the vehicle's vision system, which may prompt a controller of the vehicle to slow down and/or to move to a different travel lane. While imaging sensors (e.g., stereo camera sensors, lidar sensors, and radar sensors) may capture image data of the scene, such captured image data typically is low-level information because the captured image data has limited use for planning steering movements and making decisions for controlling the vehicle to move to the desired destination. However, the captured image data may be refined to provide high-level information. Aspects of the present technology disclosed herein involve techniques for parsing the large volume of captured image data to extract and/or predict high-level information useful to provide a succinct representation of an environment around the vehicle, including detecting and tracking objects in the vehicle's environment at a close range (e.g., within 20 m of the vehicle) and at a far range (e.g., at 200 m or more from the vehicle).

According to an aspect of the present technology, a method is provided for detecting and tracking objects in stereo-vision images. The method may comprise: (a) obtaining point-cloud data captured by stereo-vision camera sensors on a vehicle as the vehicle travels along a road surface, wherein: the point-cloud data comprises image data and depth data of an image captured at a time $t_n$, the image comprises objects imaged along an imaging direction oriented parallel to or approximately parallel to a road surface, the point-cloud data corresponds data of points of a point cloud P, and the points of the point cloud correspond to pixels of the image; (b) compressing the point-cloud data to bird's-eye-view ("BEV") data representing a view along a BEV direction oriented approximately perpendicular to the road surface, the BEV data representing the objects on a BEV plane oriented approximately parallel the road surface; (c) establishing a grid of cells for the BEV plane, wherein: each cell of the grid comprises occupancy data corresponding to a likelihood that at least one of the objects is present at a position corresponding to the cell, each cell of the grid covers a predetermined area of the BEV plane, the BEV plane encompasses regions at distances in a range from 1 m or less to 200 m or more from the vehicle; (d) for each cell of the grid, determining occupancy values of the cell for the time in and performing noise reduction by assigning weights to the cell based on predicted occupancy values of the cell for the time t, and on occupancy values of the cell for a previous time $t_{n-1}$, and (e) outputting to a controller of the vehicle, in real time or nearly real time to the time $t_n$, an occupancy evidence map based on the occupancy values of the cells of the grid for the time $t_n$, the occupancy evidence map comprising a set of tracked objects of the objects in the image.

In some embodiments of this aspect, the method may further comprise: (f1) performing a tracking update by setting the occupancy values of the cells of the grid for the time $t_n$ to be the occupancy values of the cells of the grid at the previous the time $t_{n-1}$, and repeating (a) through (e).

In some embodiments of this aspect, the method may further comprise: (f2) performing a tracking update by incrementing n and repeating (a) through (e).

In some embodiments of this aspect, each cell of the grid may comprise a plurality of particles, and in (d), the weights may be assigned to the particles of the cell for the time $t_n$ based on the occupancy values of the cell for the previous time $t_{n-1}$.

In some embodiments of this aspect, the method may further comprise, in (d), determining occupancy values of the cell for a posterior time $t_{n+1}$ prior to obtaining point-cloud data for an image captured at the posterior time $t_{n+1}$.

In some embodiments of this aspect, the occupancy values of the cells of the grid for the previous time $t_{n-1}$ may be cached and may not be stored in nonvolatile memory.

In some embodiments of this aspect, in (d), the weights assigned to the cell may cause the occupancy values of the cell for the time $t_n$ to be lower than the predicted occupancy values of the cell for the time $t_n$, if the occupancy values of the cell for the previous time $t_{n-1}$ indicate an absence of an object in the cell, and may cause the occupancy values of the cell for the time $t_n$ to be equal to higher than the predicted occupancy values of the cell for the time $t_n$, if the occupancy values of the cell for the previous time $t_{n-1}$ indicate a presence of an object in the cell.

In some embodiments of this aspect, each cell of the grid may correspond to: at least 50 points of the point cloud, or at least 100 points of the point cloud, or at least 500 points of the point cloud, or at least 1000 points of the point cloud, or at least 5000 points of the point cloud, or at least 10,000 points of the point cloud.

In some embodiments of this aspect, the grid may comprise n cells, where n is in a range of: 10,000 to 50,000, or 40,000 to 100,000, or 90,000 to 200,000, or 150,000 to 300,000, or 250,000 to 400,000, or 350,000 to 500,000, or 500,000 to 1,000,000, and, in (b), the compressing may compress the point-cloud data corresponding to at least 3 million points to the n cells of the grid.

In some embodiments of this aspect, for each cell of the grid: the occupancy values of the cell for the time $t_n$ are associated with particles of the cell, the particles of the cell are independent of each other, and the particles of the cell each comprise multi-dimensional positional parameters and multi-dimensional velocity parameters. In some embodiments, for each cell of the grid, the particles may have respective weights.

In some embodiments of this aspect, in (c), the grid may be established to be a range-based grid based on a plurality of distance ranges of the depth data of the image. In some embodiments, cells of the grid corresponding to a first distance range may have a first area, and cells of the grid corresponding to a second distance range may have a second area smaller than the first area. In some embodiments, a first portion of the point-cloud data corresponding to the first distance range may have a first resolution, and a second portion of the point-cloud data corresponding to the second distance range may have a second resolution higher than the first resolution. In some embodiments, cells corresponding to a third distance range may have a third area smaller than the second area. In some embodiments, a third portion of the point-cloud data corresponding to the third distance range may have a third resolution higher than the second resolution. I some embodiments, the first distance range may be a close range of up to about 30 m from the vehicle, the second distance range may be a medium range of about 30 m to about 70 m from the vehicle, and the third distance range may be a far range of about 70 m and greater from the vehicle. In some embodiments, cells of the grid corresponding to a distance range farthest from the vehicle may each have an area of 50 cm×50 cm or smaller. In some embodiments, a first portion of the point-cloud data corresponding to a first distance range may have a first resolution, a second portion of the point-cloud data corresponding to a second distance range may have a second resolution higher than the first resolution, and a third portion of the point-cloud data corresponding to a third distance range may have a third resolution higher than the second resolution. In some embodiments, the first resolution may be in a range of 0.5 MP to 4 MP, the second resolution may be in a range of 3 MP to 9 MP, and the third resolution may be 8 MP or greater. In some embodiments, the first resolution may be in a range of 0.5 MP to 1.5 MP, the second resolution may be in a range of 2 MP to 4 MP, and the third resolution may be in a range of 10 MP to 15 MP. In some embodiments, the occupancy evidence map may comprise a BEV occupancy evidence map having: a first resolution corresponding to the first distance range, a second resolution corresponding to the second distance range, the second resolution being higher than the first resolution, and a third resolution corresponding to the third distance range, the third resolution being higher than the second resolution. In some embodiments, the image may be a stereo image corresponding to a frame of video sequence captured by the camera sensors at the time in, and, to determine relative movement of the set of tracked objects, (a) through (c) are repeated every m frames of the video sequence, where 1≤m≤100. In some embodiments, 1≤m≤50. In some embodiments, m=1, or m=5, or m=10, or m=20, or m=25. In some embodiments, for a first portion of the point-cloud data corresponding to a first distance range, (a) through (e) may be processed at a first frame rate, and, for a second portion of the point-cloud data corresponding to a second distance range, (a) through (c) may be processed at a second frame rate lower than the first frame rate. In some embodiments, for third portion of the point-cloud data corresponding to a third distance range, (a) through (c) may be processed at a third frame rate lower than the second frame rate. In some embodiments, the second frame rate may be half the first frame rate, and the third frame rate may be half the second frame rate. In some embodiments, edge portions of adjacent distance ranges may overlap. In some embodiments, the occupancy evidence map may comprise a first region corresponding to the first distance range, a second region corresponding to the second distance range, and a third region corresponding to third distance range, and the occupancy evidence map may be outputted at a first update rate, with the first region comprising data updated at the first update rate, with the second region comprising data updated at a second update rate lower than the first update rate, and with the third region comprising data updated at a third update rate lower than the second update rate. In some embodiments, the first update rate may be in a range from 40 Hz to 45 Hz, the second update rate may be in a range from 10 Hz to 15 Hz, and the third update rate may be in a range from 1 Hz to 5 Hz.

According to another aspect of the present technology, a system is provided for detecting and tracking objects in stereo-vision images. The system may comprise at least one computer processor coupled to a memory. The at least one computer processor may be configured to perform some or all of the embodiments of the methods described herein.

According to another aspect of the present technology, a non-transitory computer-readable storage medium is provided. The storage medium may store computer-executable code that, when executed by a processing system comprising at least one computer processor, causes the processing system to perform some or all of the embodiments of the methods disclosed herein.

The foregoing features may be used, separately or together in any combination, in any of the embodiments discussed herein.

BRIEF DESCRIPTION OF DRAWINGS

The present patent or patent application file contains at least one drawing executed in color. Copies of this patent or patent application publication with color drawings will be provided by the Office upon request and payment of the necessary fee.

Various aspects and embodiments of the present technology disclosed herein are described below with reference to the accompanying figures. It should be appreciated that the figures are not necessarily drawn to scale. Items appearing in multiple figures may be indicated by the same reference numeral. For the purposes of clarity, not every component may be labeled in every figure.

DETAILED DESCRIPTION

Figure 1:
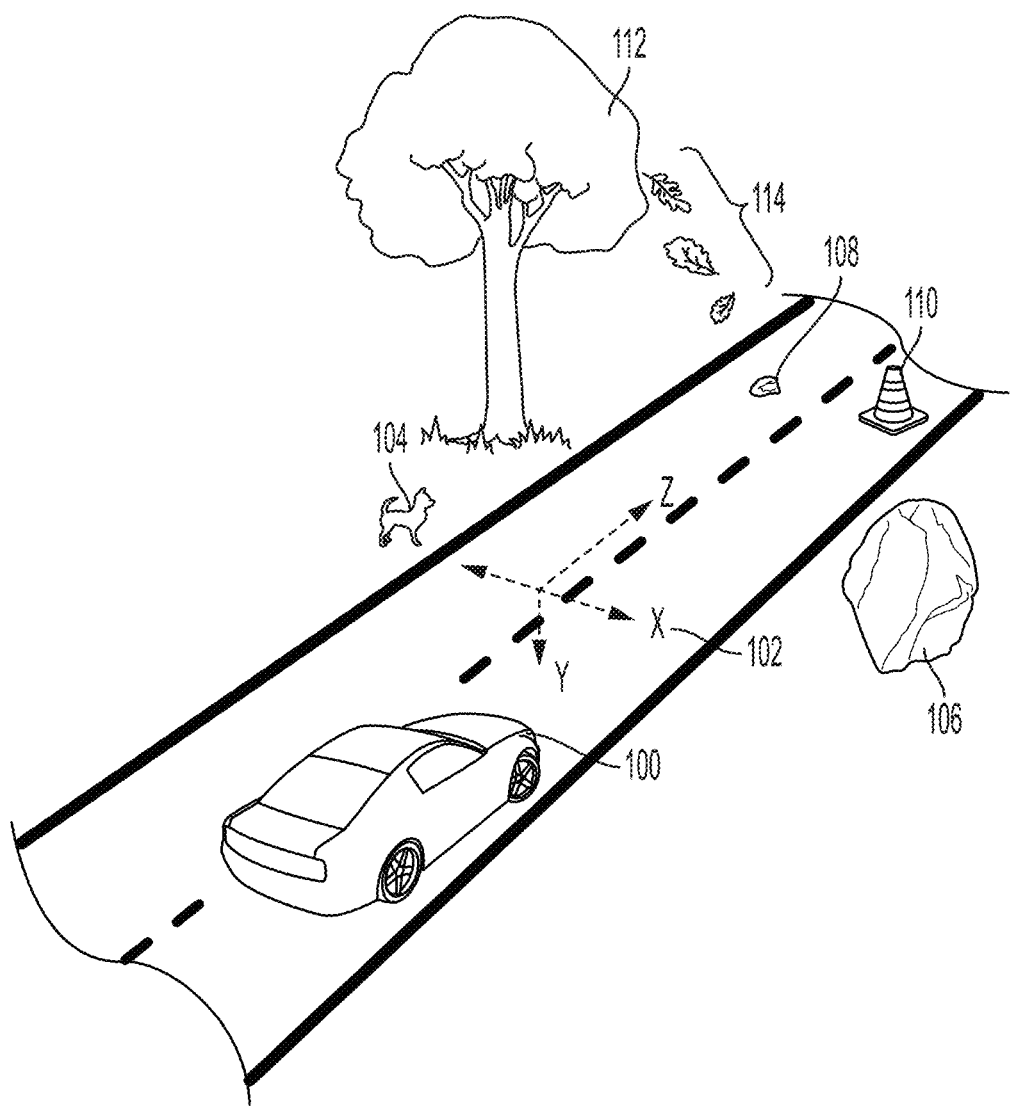
FIG. 1 schematically shows an environment of a vehicle travelling on a path.

Safe control of movement of an autonomous vehicle is of utmost concern as the push for driverless transportation advances. Vehicles may exceed one ton in weight and may travel at highway speeds in excess of about 100 kilometers per hour (or in excess of about 60 miles per hour). Erroneous control of an autonomous vehicle may result in property damage, traffic jams, and even may result in physical harm or even death to humans that may be in the travel path of the autonomous vehicle. A detailed or high-level understanding of a scene in the vehicle's travel path, both near to and far from the vehicle, may be advantageous for planning purposes, so that adequate time is available to determine one or more useable paths, select an optimal path, and control steering movements so that the vehicle travels on the optimal path. State-of-the-art camera sensors are capable of capturing high-resolution images of the scene in front of the camera sensors, as noted above. However, the volume of information associated with high-resolution images is large. Processing of such voluminous information could be costly, as it could entail sophisticated computational resources in order to process the information in sufficient time to safely control the vehicle, or may not even be possible if the amount of data exceeds processing capabilities of state-of-the-art computer processors. Disclosed herein are techniques for parsing the image data of images from a pair of camera sensors configured for capturing stereo images of a scene and for extracting and/or predicting information useful to provide a succinct representation of an environment around the vehicle, including detecting and tracking objects near the vehicle (e.g., within 20 m of the vehicle) and far from the vehicle (e.g., at 200 m from the vehicle), using ordinary computer processors that may be used for graphics processing. Also disclosed herein are techniques for transforming the image of a scene in front of the camera sensors to a bird's-eye-view ("BEV") of the scene.

Object detection typically is performed on a single-frame basis, with a pair of stereo images captured simultaneously for a time t and corresponding to a single frame of information for the time τ. In order to track an object from frame to frame, it has been suggested that accounting for temporal constraints by fusing multiple frames of data may lead to smoother estimates, reduce false alarms, and help in recovering false negatives [1]. Two approaches have been used for object tracking: model-based tracking and learned tracking. In model-based tracking techniques, object dynamics typically are explicitly enforced. One example of model-based tracking is particle-filtering-based tracking [2]. In contrast, in learned tracking techniques, object motions typically are determined or learned implicitly for an environment (e.g., crowded urban area, multi-lane highway, traffic jam, etc.) based on training data for the environment [3]. An attractive feature of model-based tracking techniques is that they allow quantification of uncertainty in estimates for some types of estimates. For example, uncertainty in estimates for object movement speed relative to the vehicle and/or for object position relative to the vehicle may be quantified.

Depth maps have become fundamental tools for onboard driver assistance systems as well as for onboard vision systems in autonomous (driverless) motor vehicles (e.g., trucks, passenger vehicles, etc.). With respect to autonomous vehicles, accurate depth maps may be essential because depth information is relied upon to make decisions for controlling the vehicles, as there may be no human in the vehicles.

Safe operation of autonomous vehicles may rely on depth information from vision systems to navigate in their environments. A vision system that senses depths over a large depth range may be used advantageously to perceive objects near and far. For example, an autonomous vehicle may use depth-sensing technology of an onboard vision system to perceive objects, road signs, landmarks, and other navigational information in a 3D environment in which the vehicle is travelling. The vision system may perform perception tasks that include, but are not limited to, object detection, tracking of detected objects, lane detection, semantic segmentation, localization, and hole filling. Object detection may, for example, entail identifying the presence of objects of a minimum size or larger. Object tracking may, for example, involve keeping track of a detected object's location over multiple frames of a video sequence, which may be particularly useful for determining whether an object is a moving object or merely noise in the image, as discussed herein. Lane detection may, for example, entail identifying, in an image, left and right boundaries of a lane in which the ego vehicle is travelling and optionally may also entail identifying boundaries of neighboring lanes. Semantic segmentation may, for example, entail categorizing each pixel of an image as one or another of a list of different categories (e.g., sky, rock, tree, water, grass, cloud, dog, etc.). Localization may, for example, entail computing the ego vehicle's position relative to its surroundings. The perception system may couple information obtained from such perception tasks to depth information calculated from a pair of stereo images to determine, for example, how quickly action must be taken to avoid hitting an object and/or what type of action(s) can be taken to avoid hitting the object. Techniques useable for object detection may be found in WO 2023/059365 A1, the entirety of which is incorporated by reference herein.

Fast and accurate determination of depth over a wide range of depths is important to perceiving objects relative to a moving vehicle. Objects that are far away may appear small in an image and therefore it may be difficult to discern whether a small spot in the image corresponds to noise or an actual object. However, even though the objects may be far away, knowledge of their presence may be significant for controlling vehicles to maneuver around them. For relatively fast-moving vehicles, such as an autonomous vehicle travelling at 100 kilometers per hour (or about 30 meters per second) on a highway, an ability to perceive objects and road boundaries at or beyond a minimum distance of 100 meters is desirable in order to have sufficient reaction time to plan for and move to a safer path and avoid the objects. Heavier vehicles (e.g., trucks loaded with cargo) may require a larger minimum distance, to account for their relatively longer stopping distances due to momentum-related considerations, in comparison with lighter vehicles (e.g., passenger cars). For example, a loaded truck traveling at legal highway speeds may need to perceive objects at a minimum distance of about 200 meters or greater, to be able to come to a complete stop. Under adverse road conditions (e.g., snow, ice, rain), this stopping distance may need to be even greater due to the potential for skidding. If it takes several seconds or more to obtain accurate depth data for road debris at a depth of about 1 kilometer, that depth data may be of questionable value for controlling a moving vehicle because the vehicle may be on top of the road debris by the time the depth data is available for use. Therefore, not only is accuracy of depth data important but processing time also is important. For relatively slow-moving vehicles, there may be less of an urgency to obtain accurate depth data for far-away objects; however, such vehicles may be operating in densely populated areas (e.g., urban cities, downtown sections of rural towns, shopping plazas, etc.) where there may be a need to react particularly quickly to objects that are very close to the vehicle. For example, a runaway shopping cart, a child chasing a ball, a cyclist or a pedestrian not obeying right-of-way rules, etc.) may suddenly appear within 3 meters or less of the vehicle, requiring quick evasive action. Accurate tracking of moving objects using depth maps may be susceptible to noise, which may result from transient debris, optically reflective surfaces, illumination conditions (e.g., sun glare, vehicle headlights, etc.), airborne objects blowing in the wind (e.g., leaves, litter, etc.). Thus, a vision system that is able to reduce the noise in depth maps is highly desirable, particularly for use in autonomous vehicles.

Driver assistance systems in human-controlled vehicles and vision systems in autonomous vehicles (collectively "vision systems") typically rely on onboard sensors to capture images of environments in which the vehicles are travelling. Camera sensors are a popular type of sensor for autonomous vehicles due to their relatively low cost and ability to capture images at high resolution (e.g., 5 PM, 10 MP, 12 MP, 15 MP, etc.) and high frame rates (e.g., 30 frames per second (FPS) or higher) in RGB color or black and white. Vision systems based on stereo cameras are currently in use or being considered for use in vehicles produced by a number of automobile manufacturers, such as Mercedes-Benz [4], Tesla [5], and Subaru [6], to name a few.

A stereo-camera system may include two camera sensors controlled to capture 2D images of a scene simultaneously. The camera sensors may be mounted on the vehicle so that the images may be captured while the vehicle is moving. Data corresponding to the images may be used to produce a depth map that provides distances or depths to objects in the scene. The depth map may, in turn, be used to produce a 3D environment map, which may be a depth map that includes information identifying particular objects in the vehicle's surroundings (e.g., pedestrians, other vehicles, potholes, debris, road surface(s), road marking(s), etc.). This information may be aggregated over time and used by one or more controllers of the vehicle to make decisions about when and how to maneuver the vehicle. For example, decisions regarding which lane to follow, operating speed, steering angle, etc., may be made based on information in the environment map.

As noted above, the quantity of data produced by high-resolution camera sensors may require time and computational resources to process. That is, while images having a resolution of 10 MP or more may be captured at a high frame rate for the scene, such images may not be particularly useful if there are insufficient computational resources available to process the image to produce useful information in time to control the vehicle safely. The inventors have developed the techniques disclosed herein to parse and process high-resolution image data to yield useful information in real time or nearly real time, and with a reduced false-positive noise, which may lead to safer operation of an autonomous vehicle equipped with a vision system that uses the disclosed techniques to control the vehicle's movement.

FIG. 1 schematically shows an environment in which an autonomous vehicle 100 travelling on a path 102 may utilize a vision system mounted in the vehicle 100 to see or perceive objects upcoming objects on or near the path 102. The path 102 may be a dirt road, a paved road, a lane of a multi-lane highway, etc. Examples of objects the vehicle 100 may perceive include, but are not limited to, a dog 104, a large boulder 106, a small rock 108, a construction cone 110, a tree 112, and airborne leaves 114. Sensors of the vision system may be arranged to capture images in line with a heading of the vehicle 100. In some embodiments of the present technology, the vision system may comprise a pair of camera sensors configured to capture a pair of stereo images (e.g., a left image and a right image). The pair of stereo images may be processed to produce a depth map comprising depths of objects in the scene relative to the vehicle, as discussed in more detail below.

Using an orthogonal system of directions, such as the X, Y, and Z directions shown in FIG. 1, if the vehicle's heading is considered to be parallel to the Z direction, an image captured by the vision system may represent an XY plane of the scene. A view of the environment from above, commonly referred to as a top view or a bird's-eye view (BEV), may correspond to an XZ plane, which may be parallel to the path 102 on which the vehicle 100 travels. These X, Y, and Z directions may be referred to in various embodiments of the present technology described herein. As will be appreciated, some of the objects the vehicle 100 may encounter may be fixed objects, such as trees, buildings, large boulders, and the like. Fixed objects may "move" relative to the vehicle 100 when the vehicle 100 moves. The vehicle 100 also may encounter moving objects that may move independently of the vehicle 100. Objects such as deer, pedestrians, other vehicles, rolling balls, flying birds, airborne leaves, and the like, may be moving objects encountered by the vehicle 100 while travelling along the path 102.

Figure 2:
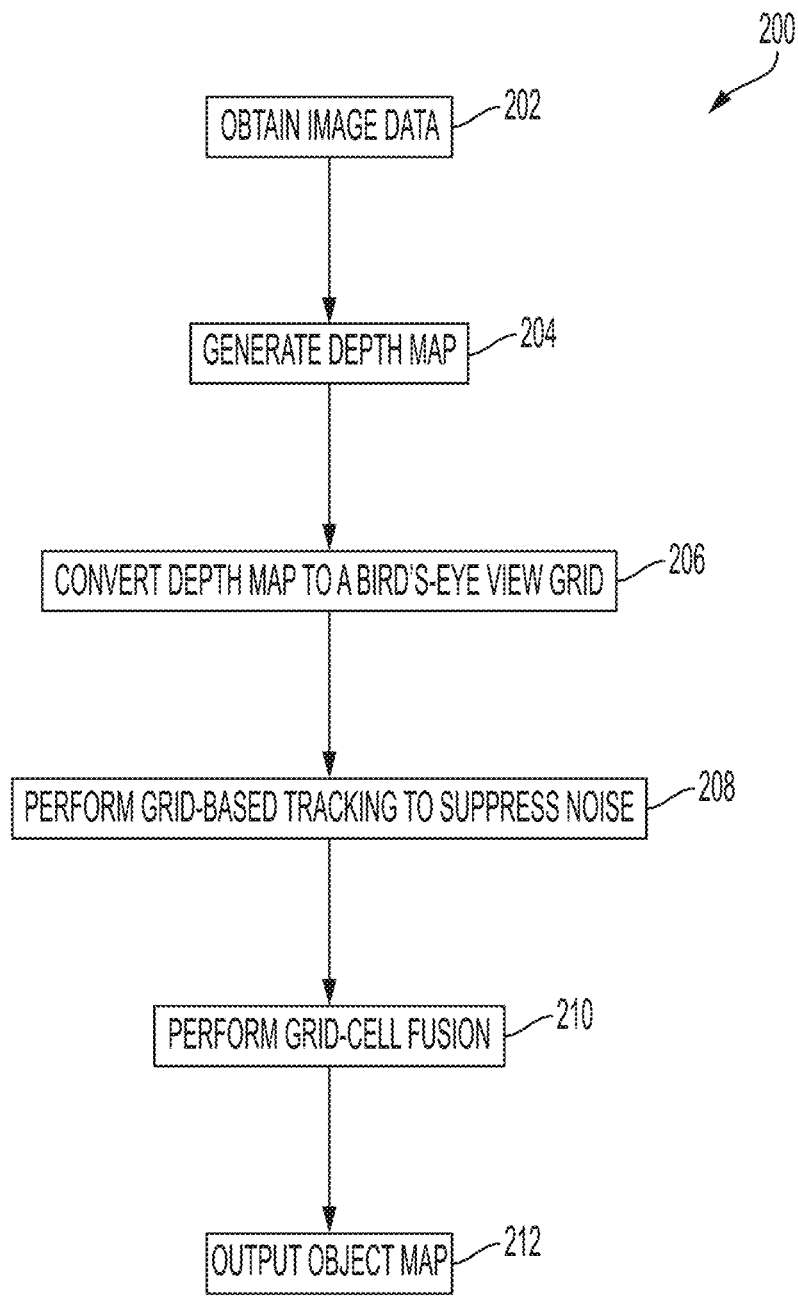
FIG. 2 shows a flow diagram for a process flow of a vision system, according to some embodiments of the present technology.

According to some embodiments of the technology disclosed herein, the vision system may process image data according to a general flow 200 summarized in FIG. 2. In some embodiments, the vision system may have an image-processing architecture comprising a depth-map component; a bird's-eye-view transformation component; a tracking component; a noise-reduction component; and a cell fusion component. In some embodiments, one or more of these components may comprise one or more software modules stored in a memory of the vision system and executed by a computer processor of the vision system, either alone or in conjunction with hardware of the vision system. At act 202 of the flow 200, image data may be obtained from at least one image of a scene captured by camera sensors of the vision system. The image data may be from one or more lidar sensors, or from one or more radar sensors, or from two or more camera sensors, or from a combination of such sensors. Included in the image data may be depth data.

According to some embodiments of the present technology, the vision system may be configured to process image data from a pair of camera sensors (e.g., a left camera sensor and a right camera sensor). The image data may correspond to a pair of stereo images captured simultaneously by the camera sensors. Although the descriptions herein of the disclosed technology relate to the use of images from camera sensors, it should be understood that aspects of the present technology may be used with images captured by other types of sensors.

According to some embodiments of the present technology, the camera sensors may capture two video streams, with each video stream comprising a sequence of frames, i.e., a plurality of consecutive images, with the pair of stereo images corresponding to simultaneously captured frames of the two video streams. In some embodiments, the image data may be obtained for every m frames of the video stream, where $1 \leq m \leq 100$.

The image data may comprise an array of pixels corresponding to an XY plane of the scene captured in the pair of stereo images. The pixels of the array may be identified by respective x and y coordinates. At act 204, the image data may be processed to generate a depth map of the XY plane, which may comprise one image of the pair of stereo images (e.g., a right image or a left image, which may be referred to as "the stereo image" herein) and also may comprise depth data determined by performing stereo matching of pixels of the pair of stereo images. The depth data may be a Z-direction depth relative to the vehicle 100. In some embodiments the depth maps may be generated to have multiple resolutions based on range or distance from the vehicle, as discussed below.

At act 206, the depth map may be converted to a multi-dimensional point cloud of the scene. In some embodiments, the point cloud may be a 3D point cloud, with each point comprising lateral-position data (e.g., x-coordinate data), height data (e.g., y-coordinate data), and depth data (e.g., z-coordinate data). In some embodiments, the point cloud may comprise a combination of two or more of: lateral-position data, height data, depth data, color data, and velocity data. As will be appreciated, other dimensions may be included in the point cloud. For the sake of simplicity, the point cloud of the present discussions may be referred to as a 3D point cloud, with each point comprising at least x, y, and z coordinate data. That is, each point may have one or more dimensions in addition to those of a 3D point cloud.

Also at act 206, the point cloud may be converted to a grid representing a bird's eye view (BEV) of the scene. The BEV grid may provide a view of an XZ plane of the scene, such as a view of the path 102 from a bird's perspective. In some embodiments, the point cloud, which may comprise millions of points, may be represented by a two-dimensional (2D) BEV grid comprising cells, with the points of the converted point cloud being distributed in the cells according to locations of objects in the scene. Cells of the BEV grid corresponding to an object may be associated with a position estimate and a velocity estimate for the object. An advantageous aspect of the conversion of the point cloud to the 2D BEV grid of cells is that, even though objects may be 3D, vehicles typically travel on a 2D surface. Therefore, when viewed from above, data associated with an object's height may be suppressed. This may allow compression of the large volume of data associated with the 3D point clouds, which are generated from the video streams, into a 2D BEV grid. The BEV grid may also be referred to herein as the BEV plane. The use of cells may permit a plurality of points to be processed collectively, on a cell-by-cell basis, instead of individually. This may reduce the amount of computational resources required to process the image data in real time or nearly real time.

According to some embodiments of the present technology, the BEV grid may be an evidence map indicating a likelihood of an object being present. For example, cells of the evidence map may comprise occupancy values for which a relatively higher value may indicate a relatively higher likelihood that the cell is occupied by an object while a relatively lower value may indicate a lower likelihood that the cell is occupied by an object. In some embodiments, conversion of a 3D point cloud to a 2D evidence map may occur on a frame-to-frame basis for every m frame(s), where m is in a range from 1 to 50, and the evidence map need not be stored. In some embodiments, the vision system may not provide non-volatile memory for storing evidence maps, which may reduce the vision system's costs. This lack of storage may be of significance because evidence maps may include spurious sensor noise and/or random imaging artifacts (e.g., random lighting reflections preventing a portion of the scene to be captured, etc.), which may lead to erroneous data points in the evidence map indicating an object's presence even though in actuality no object is present. Such spurious data points may be referred to as false positives herein. Typically, storage of evidence maps would permit comparisons to be made to determine whether a data point is erroneous. The inventors have recognized that, without storing evidence maps, keeping track of data for cells of the BEV grid, which may be useful for determining whether data for a cell likely is erroneous and due to noise or whether the data for the cell is likely to correspond to an object, poses a significant challenge. At act 208, to suppress the occurrence of false positives, the evidence map corresponding to the 3D point cloud may undergo grid-based tracking that assesses a temporal correlation between consecutive evidence maps. In some values, a lack of correlation of a point in a current evidence map when compared with a previous evidence map may reduce an occupancy value for the point. A refined or noise-reduced evidence map may be generated at act 208, in which points of the refined evidence map have undergone correlation processing and erroneous points may be suppressed. At act 210 the refined evidence map may undergo fusion processing such that adjacent grid cells, for which a likelihood that the cells are occupied by an object is above a threshold value, are fused. Such fusion of cells may permit an object that spans multiple cells to be treated as a single object. In some embodiments, a result of the fusion processing at act 210 may be an object map that provides a macro-level view of the environment in which the vehicle 100 is travelling, in terms of positions of objects in the environment and velocities of the objects relative to the vehicle 100. At act 212, the object map is outputted to a vehicle controller of the vehicle 100.

Figure 3:
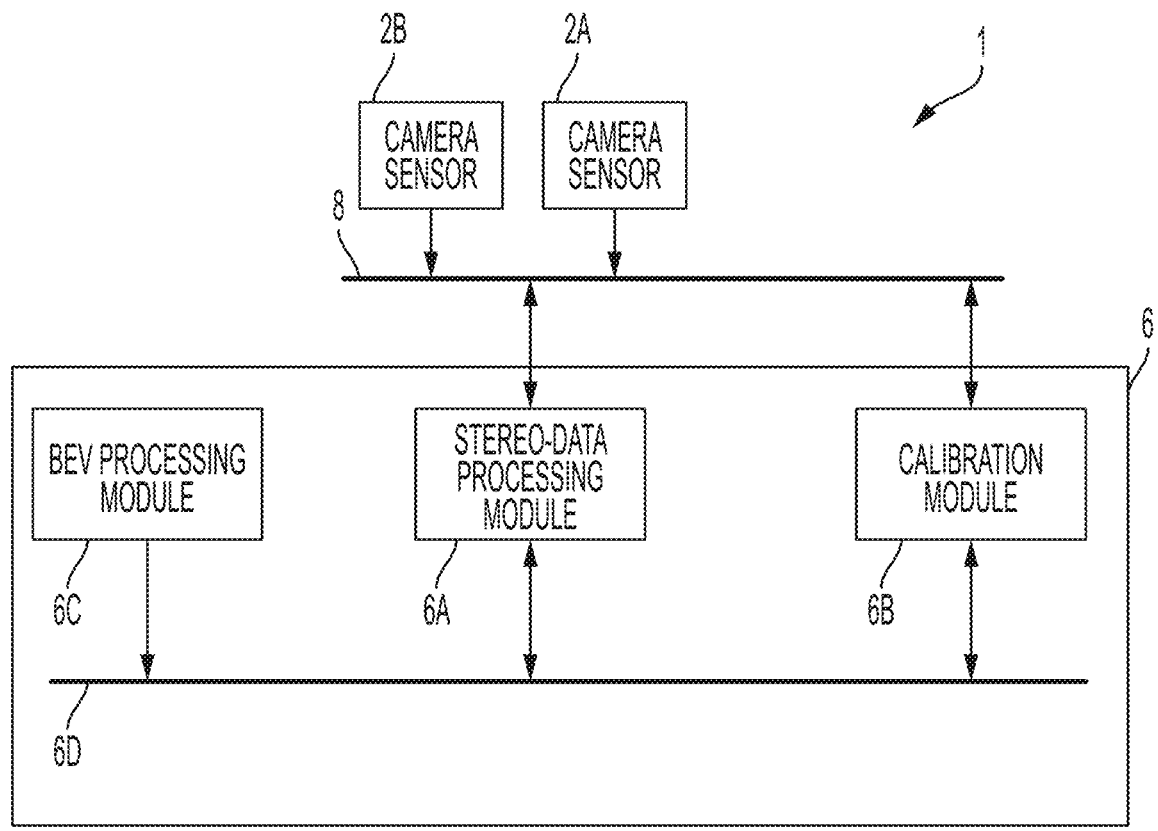
FIG. 3 shows a block diagram of a vision system, according to some embodiments of the present technology.

FIG. 3 is a block diagram of a vision system 1, according to some embodiments of the present technology. The vision system 1 may be configured to be carried by an autonomous vehicle capable of moving without human intervention (e.g., an autonomous truck, an autonomous car, an autonomous robot, an autonomous aircraft, an autonomous sailing vessel, etc.), or may be part of a driver assistance system carried by a human-controlled vehicle. The vision system 1 may comprise a pair of stereo camera sensors 2A, 2B connected to a computer processing system 6 via a communication bus 8 or via a known wireless communication technique.

Figure 4:
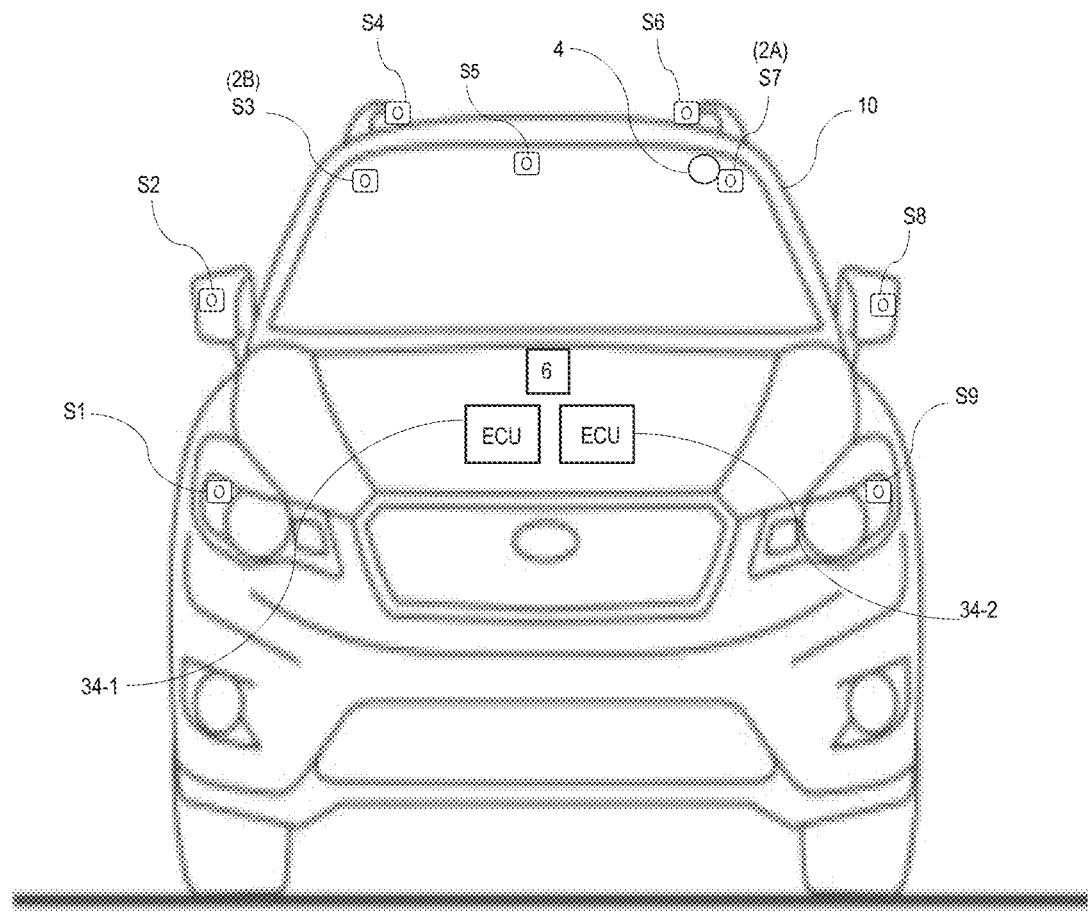
FIG. 4 schematically shows an autonomous vehicle, according to some embodiments of the present technology.

According to some embodiments of the present technology, the vehicle carrying the vision system 1 may be a car 10 and the camera sensors 2A, 2B may comprise any two of a plurality of cameras sensors S1, S2, . . . , S9 deployed on the car 10, as depicted in FIG. 4. For example, as depicted in FIG. 4, the camera sensor 2A may comprise the sensor S7, and the camera sensor 2B may comprise the sensor S3. The camera sensors 2A, 2B may be configured to capture images of the car's environment simultaneously, i.e., at the same or nearly the same moment of time. Although the camera sensors 2A, 2B may be referred to herein as "right" and "left" cameras or "right" and "left" sensors, they need not be positioned in a horizontal configuration but may instead be positioned in a vertical configuration (e.g., top and bottom) relative to each other, or diagonally relative to each other, or offset in different range bins (e.g., one camera may be at a front portion of the car 10 and the other camera may be at a rear portion of the car 10). The cameras sensors 2A, 2B may comprise, e.g., color CMOS (complementary metal-oxide-semiconductor) cameras, grayscale CMOS cameras, CCD (charge-coupled device) cameras, SWIR (short-wavelength infrared) cameras, LWIR (long-wavelength infrared) cameras, or focal-plane array sensors. In some embodiments, the car 10 may comprise the vehicle 100 discussed above.

According to some embodiments of the present technology, the computer processing system 6 of the vision system 1 may comprise at least one computer processor coupled to at least one memory. The at least one memory may store a stereo-data processing module 6A, a calibration module 6B, and a BEV processing module 6C. In some embodiments, the stereo-data processing module 6A may store code that is executed by the at least one computer processor, the calibration module 6B may store code that is executed by the at least one computer processor, and the BEV processing module 6C may store code that is executed by the at least one computer processor. In some embodiments, each of the processing modules 6A, 6B, 6C may be coupled to its own computer processor dedicated to executing the code stored in its corresponding processing module. In such embodiments, each of the dedicated computer processors may be in communication with each other via a communication bus 6D or via a known wireless communication means. In some embodiments, the communication bus 6D may be the same as or connected to the communication bus 8. In some other embodiments, all of the processing modules 6A, 6B, 6C may be coupled to a single computer processor configured to execute the code of some or all of the processing modules 6A, 6B, 6C in parallel. Operations of the processing modules 6A, 6B, 6C are discussed below.

Figure 5:
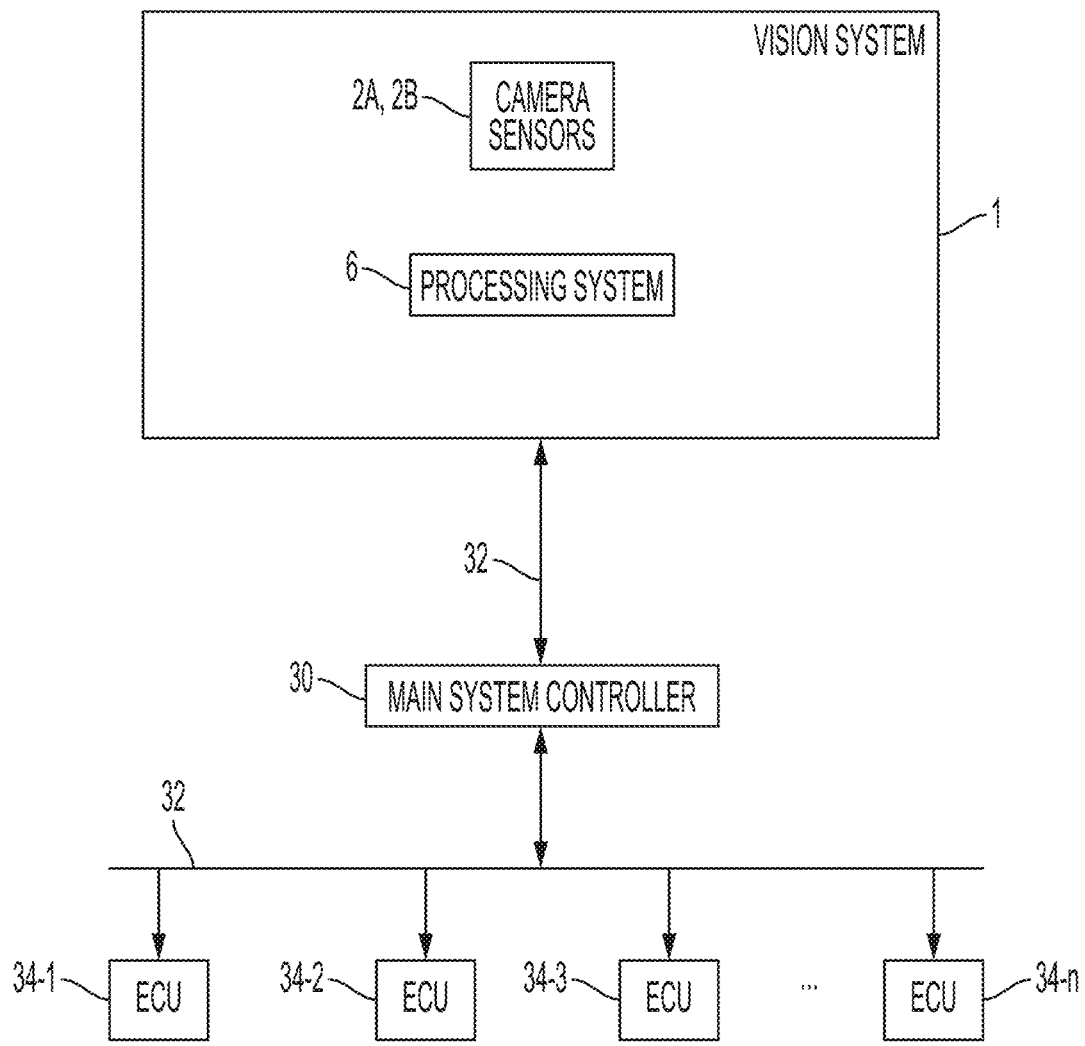
FIG. 5 shows a block diagram of a vision system coupled to electronics of an autonomous vehicle, according to some embodiments of the present technology.

According to some embodiments of the present technology, the vision system 1 may be coupled to a main system controller 30 of the car 10, as schematically shown in FIG. 5. In some embodiments, the main system controller 30 may be the car's control system, which may be configured to control all automated aspects of operation of the car 10. In some embodiments, the vision system 1 may be configured to be commanded by the main system controller 30, and may communicate signals to and receive signals from the main system controller 30 via a command and control line 32. As will be appreciated, the command and control line 32 may be a wired communication mechanism (e.g., a data bus, a communication line) or may be a wireless communication mechanism using communication techniques known in the art. In some embodiments, the main system controller 30 may comprise at least one computer processor configured to orchestrate high-level functions (e.g., automatic emergency braking, route selection, etc.) and to communicate with various sub-systems or electronic control units (ECUs) 34-1, 34-2, 34-3, . . . , 34-*n* and with the vision system 1 to carry out the high-level functions. In some embodiments, common communication protocols may be used for communication via the command and control line 32 (e.g., Ethernet, CAN (Controller Area Network), I2C (Inter-Integrated Circuit), LIN (Local Interconnect Network), etc.). Although the vision system 1 is shown in FIG. 5 to be separate from the main system controller 30, the vision system 1 may, in some embodiments, be part of the main system controller 30 and may, in some embodiments, be physically located in a housing of the main system controller 30.

According to some embodiments of the present technology, the main system controller 30 or a control module (not shown) of the computer processing system 6 of the vision system 1 may be configured to control the camera sensors 2A, 2B to capture images synchronously with each other. For example, the synchronous images may be part of two video streams comprising frames or images captured simultaneously at regular intervals (e.g., every 0.1 second, or every 0.5 second, or every 1 second, or every 1.5 second, etc.) and provided to the stereo-data processing module 6A as a stream of stereo-image pairs.

According to some embodiments of the present technology, a result that is output in real time or nearly real time may refer to a result that is output within 1 second (e.g., within 0.5 second, or within 0.2 second, or within 0.1 second, or within 10 milliseconds, or within 1 millisecond) of when data for determining the result is provided to a device that performs the determining and that outputs the result. In some embodiments, the stereo-data processing module 6A may output a depth map corresponding to a pair of stereo images within 1 second of when the pair of stereo images is provided to the stereo-data processing module 6A. In some embodiments, the stereo-data processing module 6A may output a depth map corresponding to a pair of stereo images within 0.1 second (i.e., within 100 milliseconds) of when the pair of stereo images are captured by the camera sensors 2A, 2B.

Returning to FIG. 3, as noted above, the camera sensors 2A, 2B may be coupled to the stereo-data processing module 6A via the communication bus 8 or via a wireless communication technique. According to some embodiments of the present technology, image data of a scene captured by the camera sensors 2A, 2B may be transferred via a known communication interface (e.g., a USB (Universal Serial Bus) connector, an Ethernet connector, a MIPI (Mobile Industry Processor Interface) CSI (Camera Serial Interface) connector, GMSL (Gigabit Multimedia Serial Link) connector, Flat Panel Display Link (FPD-Link) connector, and the like). In some embodiments, the camera sensors 2A, 2B may be configured to transmit the image data to the stereo-data processing module 6A in real time or nearly real time, directly or via a buffer memory device (e.g., RAM), which may be incorporated in the camera sensors 2A, 2B. In some embodiments, the camera sensors 2A, 2B may be associated with a data-storage memory device (not shown) accessible by the stereo-data processing module 6A as well as other parts of the computer processing system 6, and the camera sensors 2A, 2B may be configured to transmit the image data to the data storage device. As mentioned above, the camera sensors 2A, 2B may be video sensors configured to capture streams of video data of the scene. The streams of video data may be comprised of a left stream and a right stream, with each stream being comprised of a sequence of frames. Thus, the term "image data" as used herein may refer to frames of video data, in some embodiments.

According to some embodiments of the present technology, the stereo-data processing module 6A may communicate information obtained from the image data provided by the camera sensors 2A, 2B to the calibration module 6B via the communication bus 8 for electronic calibration of the camera sensors 2A, 2B. The calibration module 6B may, in turn, process the information and provide calibration parameters to the stereo-data processing module 6A for rectifying the image data provided by the camera sensors 2A, 2B more accurately. Calibration may be performed in real time or nearly real time for every pair of stereo images or periodically (e.g., every other pair of stereo images, or every $5^{th}$ pair of stereo images, or every $10^{th}$ pair of stereo images, etc.). Calibration techniques that may be performed by the calibration module 6B are described in U.S. Pat. No. 11,282,234, the entirety of which is incorporated by reference herein. In some embodiments, electronic calibration of the camera sensors 2A, 2B may take place at the camera sensors 2A, 2B. In such embodiments, the camera sensors 2A, 2B may communicate directly with the calibration module 6B and vice versa, such that current calibration information and/or image data may be provided from the camera sensors 2A, 2B to the calibration module 6B and such that updated calibration information may be provided from the calibration module 6B to the camera sensors 2A, 2B.

According to some embodiments of the present technology, the stereo-data processing module 6A may generate a depth map from a pair of stereo images. In some embodiments, the depth map may be a disparity map generated based on image data corresponding to stereo images of a scene captured simultaneously by the camera sensors 2A, 2B on board the car 10. In some embodiments, the depth map may be provided to the computer processing system 6 from an external source. The depth map may provide 3D information in that the depth map may be a 2D map comprising pixels having pixel values each corresponding to a depth or distance at the portion of the scene of the corresponding pixel. The depth map may result from a stereo-matching process performed on the pair of stereo images to match pixels on a pixel-by-pixel basis, to determine a depth of a portion of the scene corresponding to the matched pair of pixels. In some embodiments, the depth may be calculated for a matched pair of pixels based on a disparity of the matched pair of pixels, using expression (1):

$$D = \frac{fb}{d}. \tag{1}$$

In expression (1), D is the distance or depth at the portion of the scene corresponding to the marched pair of pixels, f is the focal length of the camera sensor (e.g., the left camera sensor 2B), b is the baseline or direct distance between the right camera sensor 2A and the left camera sensor 2B, and d is the disparity between the matched pair of pixels. Downsampling of the pair of stereo images may be performed by the stereo-data processing module 6A using multi-resolution techniques of the present technology, discussed below, to reduce the computational load for generating the depth map. The downsampling may advantageously increase an update frequency at which subsequent depth maps may be generated for subsequent pairs of stereo images.

According to some embodiments of the present technology, the depth map may comprise a 3D point cloud. The 3D point cloud may be provided by the stereo-data processing module 6A to the BEV processing module 6C via the communication bus 6D or via a direct link (not shown in FIG. 3). The BEV processing module 6C may generate and output an object map to the main system controller 30. In some embodiments, the BEV processing module 6C may comprise a BEV conversion model configured to convert the 3D point cloud to a BEV grid, a tracker configured to reduce noise in the BEV grid by perform temporal tracking of objects in cells of the BEV grid relative to objects in cells of a previous BEV grid, and a cell fusion processor configured to fuse adjacent cells of the BEV grid that exceed a threshold indicating that the adjacent cells are likely to be occupied by a common object. That is, the common object may span across the adjacent cells. Once fused, the cells corresponding to the common object may be processed collectively instead of individually.

Details of operations of the BEV processing module 6C, according to some embodiments of the present technology are described below. At least some of the operations of the BEV processing module 6C may be performed in parallel. For example, for at least some of the operations of the tracker of the BEV processing module 6C, each cell of the BEV grid may be processed individually or in parallel. The parallel processing may use known techniques and/or known devices to increase processing speed, including any one or any combination of: multiple CPUs, a multi-core CPU, multi-threading techniques, and the like.

A. Bird's-Eye View (BEV) Conversion Model

As noted above, a depth map may be generated from a pair of images of a scene captured simultaneously by a pair of camera sensors mounted on a vehicle, and may comprise pixels that provide 3D information of an environment of the vehicle. Each pixel may comprise position information for identifying the pixel in an XY plane corresponding to the stereo image and also may comprise depth information indicating a Z-direction depth of a portion of the scene corresponding to the pixel. Additionally, each pixel may comprise color information. A point cloud may be generated from the depth map using known techniques. Each point of the point cloud may comprise data representing x, y, and z geometric coordinates as well as other data regarding a single spot or point on a surface of the scene, which may be the surface of an object in the scene. The points of the point cloud may then be represented on a BEV grid of cells to provide a top view of an XZ plane of the environment of the vehicle.

According to some embodiments of the present technology, a point cloud P may comprise a set of points in a contiguous 3D space extending in the X, Y, and Z dimensions, i.e., $P=\{(x_k, y_k, z_k)\}$, $\forall k \in [1, \ldots, N]$, where $(x_k, y_k, z_k)$ represents the coordinates of point k in the 3D space. In some embodiments, the BEV conversion model of the BEV processing module 6C may parse the point cloud data in stages to compute an evidence map for objects in the environment of the vehicle.

1. Discretization Stage

At this stage, the point cloud may be divided into discrete cells. That is the contiguous space of the point cloud may be discretized into cells on the XZ plane. Along the X axis, the XZ plane may be divided into $M_X$ intervals, where the i-th interval is $[x_{i-1}, x_i)$. Similarly, along the Z axis, the XZ plane may be split into $M_Z$ intervals, where the j-th interval is $[z_{j-1}, z_j)$. Thus, $x_0$, $x_{M_X}$, $z_0$, $z_{M_Z}$ may correspond to $X_{min}$, $X_{max}$, $Z_{min}$, $Z_{max}$, respectively, where $X_{min}$ represents a minimum value of the XZ plane along the X axis, $X_{max}$ represents a maximum value of the XZ plane along the X axis, $Z_{min}$ represents a minimum value of the XZ plane along the Z axis, and $Z_{max}$ represents a maximum value of the XZ plane along the Z axis. Each cell may span an interval along the X axis and an interval along the Z axis. For each cell $c_{ij}$ of the XZ plane, a set of all points in the cell $c_{ij}$ may be denoted by $\mathbb{P}_{ij}=\{(x_k, y_k, z_k)\}$ if and only if $x_{i-1} \leq x_k < x_i$ and $z_{j-1} \leq z_k < z_j$. As will be appreciated, a cell occupied by an object may include a greater number of points while a cell not occupied by an object may include a fewer number of points.

2. Histogram Generation Stage

At this stage, a range-weighted preliminary occupancy histogram $S^a$ is generated. As will be appreciated, the histogram may be a matrix and therefore the terms matrix and histogram may be used interchangeably herein.

Initially, a histogram H is generated in which each point of the point cloud $\mathbb{P}$ may be weighted proportionally to a square of a distance of the point to the camera sensors, according to expression (2):

$$h_{ij} = \Sigma_k z_k \times z_k, \forall (x_k, y_k, z_k) \in \mathbb{P}_{ij}, \quad (2)$$

where $h_{ij}$ represents a histogram point. Such weighting of the histogram points by their respective ranges may function to account for a diminishing density of points at farther distances from the camera sensors compared with a density of points at closer distances from the camera sensor.

The histogram points $h_{ij}$ may comprise values that indicate a degree of occupancy. To ensure that values of the histogram points $h_{ij}$ are agnostic to or unaffected by object size and grid resolution (i.e., cell size), a saturation function may be imposed on the histogram points $h_{ij}$ to transform the histogram H to the preliminary occupancy histogram $S^a$, which may comprise preliminary occupancy indicators, according to expression (3):

$$s_{ij}^a = f\left(\frac{h_{ij}}{\sigma_a}\right), \quad (3)$$

where $$f(x) = \frac{1-e^{-x}}{1+e^{-x}},$$

where $\sigma_a$ is a steepness parameter, and where $s_{ij}^a$ corresponds to a preliminary occupancy indicator for a cell located at the i-th interval along the X axis and the j-th interval along the Z axis. Thus, the preliminary occupancy histogram $S^a$ is weighted based on range.

Optionally, to confine values of the histogram points $h_{ij}$ of the histogram H to a range of [0, 1], a normalized histogram $\hat{H}$ may be generated, according to expression (4):

$$\hat{h}_{ij} = \frac{h_{ij}}{h}, \quad (4)$$

where $\hat{h}_{ij}$ represents a histogram point, and where $h=\Sigma_{i,j} h_{ij}$. If normalization is desired, the normalized histogram points $\hat{h}_{ij}$ may be used instead of the histogram points $h_{ij}$ in expression (3) for the preliminary occupancy histogram $S^a$.

3. Surface-Filtering Stage

At this stage, a gradient-operated filter is applied to object surfaces. Typically, a drivable surface (e.g., a paved road surface) may be associated with small changes in the preliminary occupancy indicators $s_{ij}^a$ at cells of the preliminary occupancy histogram $S^a$ corresponding to the road surface. That is, the preliminary occupancy matrix $S^a$ may show smooth transitions in histogram values for a typical road surface. Obstacle boundaries, on the other hand, may appear as relatively sharper changes in the histogram values of the preliminary occupancy matrix $S^a$. That is, a characteristic of an object's border or surface may appear as an abrupt change in the values of the preliminary occupancy indicators $s_{ij}^a$. According to some embodiments of the present technology, an abrupt change may be a change above a predetermined threshold of 10% or 15% or 20% in the values of the preliminary occupancy indicators $s_{ij}^a$ of adjacent cells. This characteristic may be used to detect an object in the scene.

In some embodiments, object borders may be detected by filtering the preliminary occupancy indicators $s_{ij}^a$ to emphasize abrupt changes.

According to some embodiments of the present technology, a Sobel filter [7] may be applied to the preliminary occupancy matrix $S^a$ to differentiate object borders from the road surface. The Sobel filter may be used to perform a combination of Gaussian smoothing and differentiation, in the X and Z directions, respectively, according to expression (5):

$$G_x = K_x \otimes S^a, \text{ and}$$

$$G_z = K_z \otimes S^a, \quad (5)$$

where $G_x$ and $G_z$ are gradients in the X and Z directions, respectively, where $K_x$ and $K_z$ are kernels in the X and Z directions, respectively, and where $\otimes$ denotes a correlation operation. That is, for each cell, the preliminary occupancy indicator $s_{ij}^a$ may undergo the correlation operation $\otimes$ with a kernel in the X direction to arrive at a gradient $g_x$, and may undergo the correlation operation $\otimes$ with a kernel in the Z direction to arrive at the gradient $g_z$, to determine a cell gradient $g_{ij}$ by computing an average of absolute values of the two gradients, i.e., $g_{ij} = (|g_x| + |g_z|)/2$. An overall gradient matrix G may be represented by expression (6):

$$G = \frac{|G_x| + |G_z|}{2}, \quad (6)$$

where the overall gradient matrix G comprises the cell gradients $g_{ij}$ of the cells located at the i-th interval along the X axis and the j-th interval along the Z axis.

The cell gradients $g_{ij}$ of the overall gradient matrix G may comprise values that indicate evidence of occupancy. An occupancy evidence indicator matrix $S^b$ may be generated in which the cell gradients $g_{ij}$ are normalized to have values in a range of [0.0, 1.0] by applying a saturation function, according to expression (7):

$$s_{ij}^a = f(g_{ij}/\sigma_b), \quad (7)$$

where $$f(x) = \frac{1 - e^{-x}}{1 + e^{-x}},$$

where $\sigma_b$ is a steepness parameter, and where $s_{ij}^b$ corresponds to an occupancy evidence indicator for a cell located at the i-th interval along the X axis and the j-th interval along the Z axis.

According to some embodiments of the present technology, an output of the BEV conversion model is the occupancy evidence indicator matrix $S^b$, where each element su provides quantitatively evidence of a likelihood of an object being present in the cell $c_{ij}$. If $s_{ij}^b$ has a value close to 1.0, this may serve as evidence of a higher likelihood of an object occupying the cell. On the other hand, if $s_{ij}^b$ has a value close to 0.0, this may serve as evidence of a higher likelihood of the cell being empty.

With respect to the steepness parameter $\sigma_\alpha$, this value may be determined such that the preliminary occupancy indicators $s_{ij}^a$ of the preliminary occupancy matrix $S^a$ are not oversaturated, i.e., they do not predominantly have values close to 1.0, and such that the preliminary occupancy indicators $s_{ij}^a$ are not undersaturated, i.e., they do not predominantly have values close to 0.0, for objects of interest.

According to some embodiments of the present technology, the steepness parameter $\sigma_a$ for a vision system (e.g., the vision system 1) may be tuned such that a maximum value of the preliminary occupancy matrix $S^a$ is in a range of [0.75, 0.95]. In some embodiments, such tuning may be performed once for a particular vision-system design, and may be used for all vision systems of the same design. In some embodiments, such tuning may be a factory preset performed individually for individual vision systems. With either approach, selection of the steepness parameter $\sigma_a$ can be automated and performed without human intervention. For example, by uploading sample stereo images from a vision system to a predetermined server configured to perform steepness calibration, an optimal value for the steepness parameter $\sigma_a$ for the vision system may be computed and downloaded to the vision system. Once the vision system has the optimal value for the steepness parameter $\sigma_\alpha$, the vision system need not change its steepness parameter $\sigma_\alpha$.

Similarly, with respect to the steepness parameter $\sigma_b$, this value may be determined such that the occupancy evidence indicators $s_{ij}^b$ of the occupancy evidence indicator matrix $S^b$ are not oversaturated, i.e., they do not predominantly have values close to 1.0, and such that the occupancy evidence indicators $s_{ij}^b$ are not undersaturated, i.e., they do not predominantly have values close to 0.0, for objects of interest. According to some embodiments of the present technology, the steepness parameter $\sigma_b$ for a vision system (e.g., the vision system 1) may be tuned such that a maximum value of the occupancy evidence indicator matrix $S^a$ is in a range of [0.75, 0.95]. In some embodiments, such tuning may be performed once for a particular vision-system design, and may be used for all vision systems of the same design. In some embodiments, such tuning may be a factory preset performed individually for individually vision systems. With either approach, selection of the steepness parameter $\sigma_b$ can be automated and performed without human intervention. For example, by uploading sample stereo images from a vision system to a predetermined server configured to perform steepness calibration, an optimal value for the steepness parameter $\sigma_b$ for the vision system may be computed and downloaded to the vision system. Once the vision system has the optimal value for the steepness parameter $\sigma_b$, the vision system need not change its steepness parameter $\sigma_b$.

FIGS. 6A, 6B, 6C, and 6D illustrate an example of a simulated transformation of a BEV grid of cells showing points of a point cloud (FIG. 6A), to a normalized, range-weighted histogram of the cells of the BEV grid (FIG. 6B), to a refined evidence map (FIGS. 6C and 6D) comprising a normalized occupancy evidence indicator matrix $S^b$ corresponding to the cells of the BEV grid. In the BEV grid of FIG. 6A, an approximate location of camera sensors of a vision system that may be used to generate the point cloud is indicated by the vehicle 100. In this example, the camera sensors would be located at an origin (x=0) in the X direction and an origin (z=0) in the Z direction. As illustrated in FIG. 1, the Z direction is the depth direction relative to the vehicle 100, and the X direction is a lateral direction relative to the vehicle 100. In this example, the point cloud is generated from a simulated image in which two rectangular objects are located on a flat surface (e.g., logs on a paved road surface) at different depths or distances from the camera sensors. Positions of the objects are represented by rectangles 602, 604 in FIG. 6A. In general, for a point cloud, a higher density of points indicates a higher degree of evidence of an object, and a lower density of points indicates a lower degree of evidence of an object.

A noticeable feature of the top view (BEV) of the point cloud (FIG. 6A) is that a proximal edge of each of the rectangles 602, 604, i.e., an edge closest to the camera sensors, has a higher density of points than other portions of the BEV rendering of the point cloud and has a higher density of points than other portions of the rectangles 602, 604. Another noticeable feature of the BEV rendering is that the rectangle 604 representing the object farther from the vehicle 100 has a lower density of points than the rectangle 602 representing the object closer to the vehicle 100. This difference is expected and may be understood as a typical decrease in point cloud points with an increase in distance, for point clouds generated from images captured by camera sensors. A further noticeable feature of the BEV rendering of the point cloud is that height data in the vertical direction, i.e., the Y direction in FIG. 1, has been suppressed in the BEV rendering.

Figure 6A:
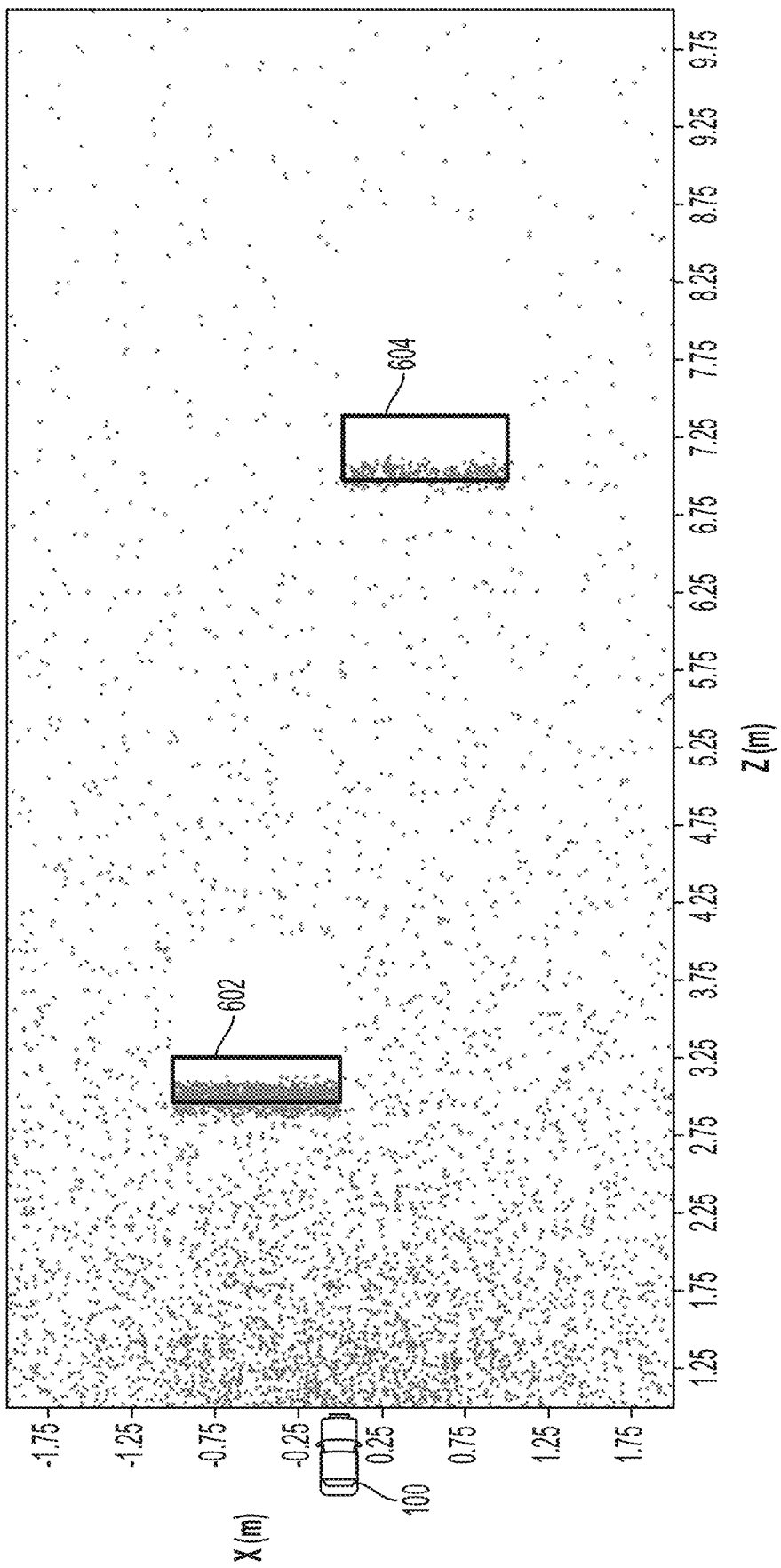
FIGS. 6A, 6B, 6C, and 6D illustrate an example of a simulated transformation of a BEV grid of cells showing points of a point cloud (FIG. 6A), to a normalized, range-weighted histogram of the cells of the BEV grid (FIG. 6B), to a refined evidence map (FIGS. 6C and 6D), according to some embodiments of the present technology.

In FIG. 6A, the BEV grid is divided into cells each having a size of 0.5 m×0.5 m. That is, the BEV grid is divided into intervals of 0.5 m along the X direction and intervals of 0.5 m along the Z direction, as indicated by the spacings of the intervals on the x-axis and the z-axis of the BEV grid.

Figure 6B:
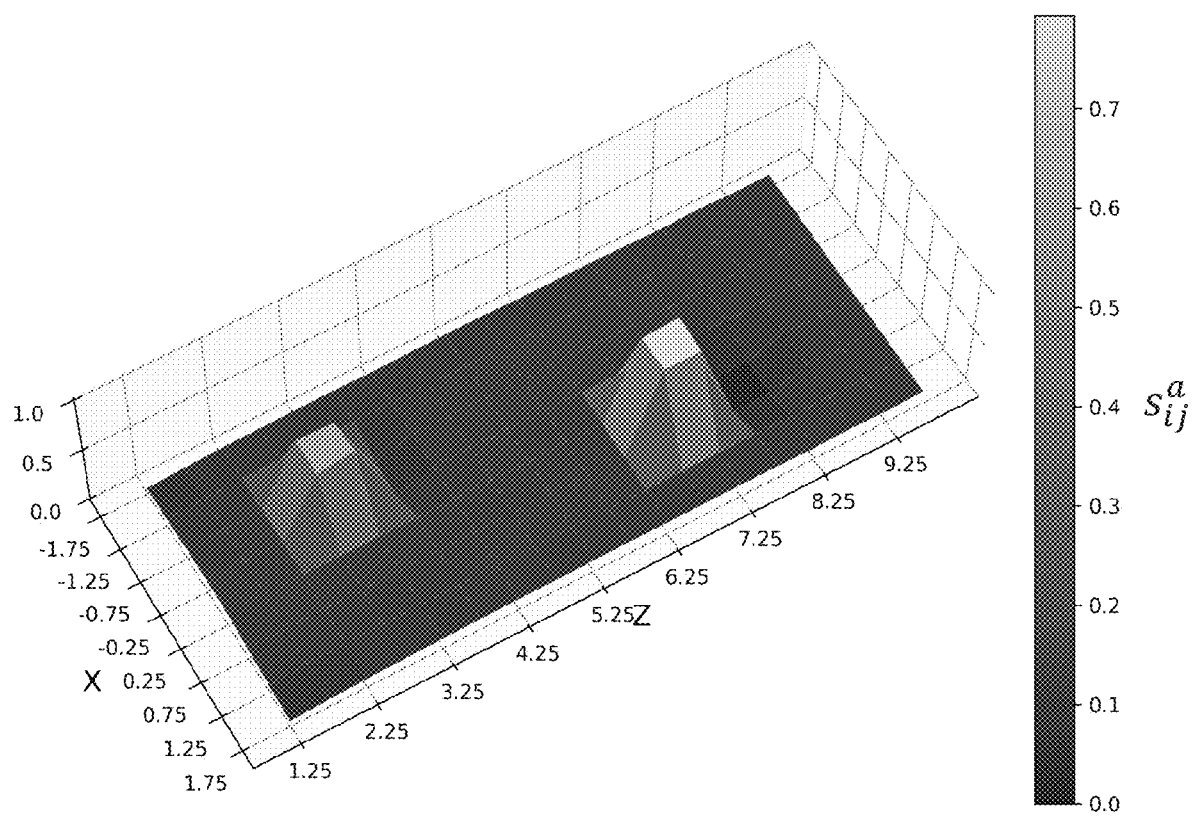

FIG. 6B shows a perspective view of the preliminary occupancy matrix $S^a$, i.e., the normalized, range-weighted histogram $S^a$, generated for the cells of the BEV grid in FIG. 6A. After normalization, the range-weighted histogram $S^a$ shows hot spots in regions where there are objects. In FIG. 6B, values of the preliminary occupancy indicators $s_{ij}^a$ are shaded (or color coded) according to a shading (or color) scheme shown on the right of FIG. 6B. The cells having higher values for the preliminary occupancy indicators $s_{ij}^a$ are the hot spots (lighter regions) corresponding to the rectangles 602, 604 associated with the objects, with a maximum value being about 0.8. Regions away from the hot spots (darker regions), associated with the flat surface discussed above (e.g., the paved road surface), have values for the preliminary occupancy indicators $s_{ij}^a$ of about 0.1, yielding a signal-to-noise ratio (SNR) of about 8. The relatively large values for the preliminary occupancy indicators $s_{ij}^a$ associated with the flat surface may pose difficulties in discerning small objects on the flat surface due to the relatively low SNR. With surface filtering, the SNR may be increased.

Figure 6C:
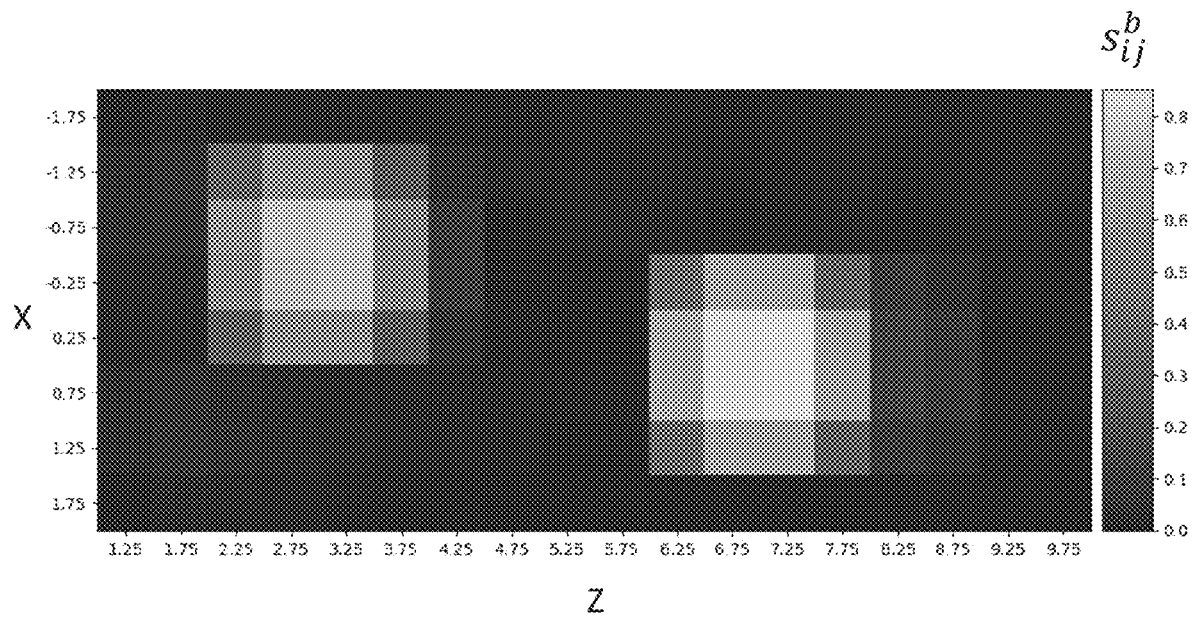
Figure 6D:
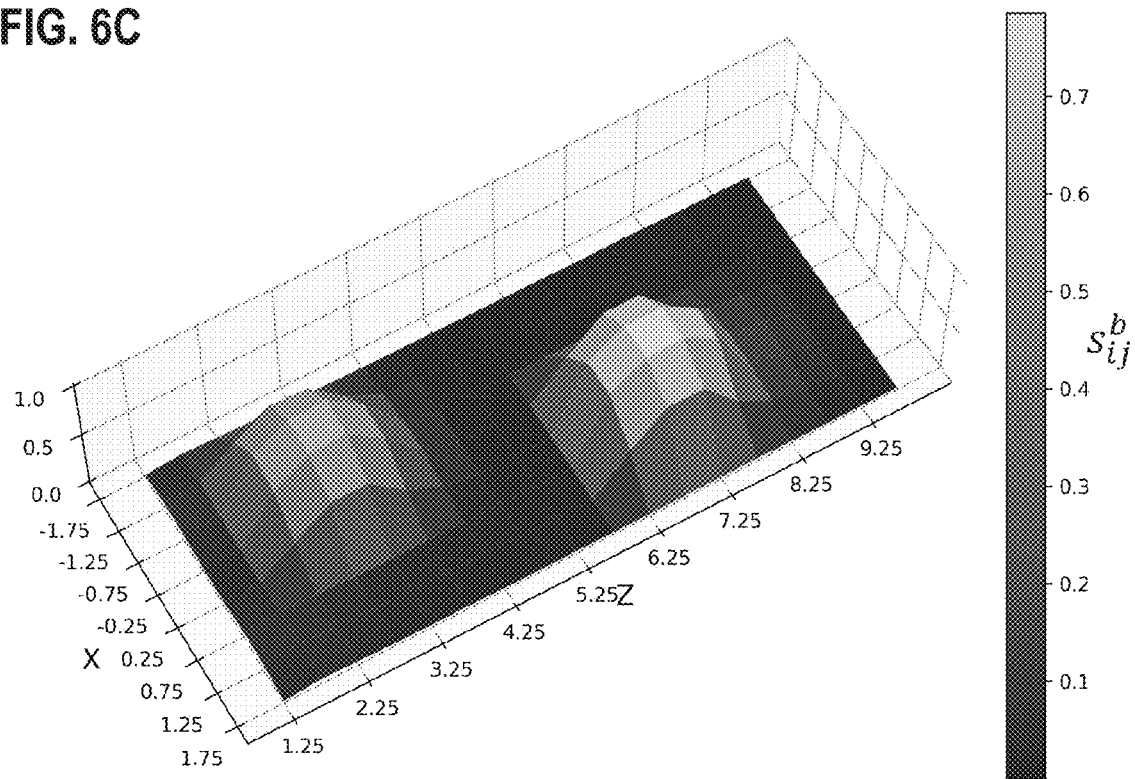

FIGS. 6C and 6D show a top view and a perspective view, respectively, of the occupancy evidence indicator matrix $S^b$ or refined evidence map generated from the preliminary occupancy matrix $S^a$. After gradient-operated surface filtering is performed on the preliminary occupancy matrix $S^a$, the resulting occupancy evidence indicator matrix $S^b$ has values of the occupancy evidence indicators $s_{ij}^a$ close to 0.01 for the regions corresponding to the flat surface while the values corresponding to the objects are preserved. The surface filter resulted in the occupancy evidence indicator matrix $S^b$ having a SNR of 64, which is 8 times greater than the SNR of the preliminary occupancy matrix $S^a$. Thus, with such filtering to refine the evidence map or preliminary occupancy matrix $S^a$, the refined evidence map or occupancy evidence indicator matrix $S^b$ may be useable to detect small objects.

B. Grid-Based Tracker

Although the BEV conversion model may output a refined evidence map or occupancy evidence indicator matrix $S^b$ comprising measurement data z for each cell of the BEV grid, and thus may provide information for objects in the cells, the output can be noisy because of factors such as vibrations, change in lighting, reflective surfaces, etc. The inventors have recognized and appreciated that a stable estimate of the environment of the vehicle is desirable. To this end, a grid-based tracker has been developed that functions to provide temporal tracking of the measurement data z of the cells. This tracker relies on Bayesian statistical inference to estimate a posterior occupancy probability of a cell based on a current state of occupancy of the cell. At any point of time t, a state of occupancy of a cell or may be defined according to expression (8):

$$o_t \in \{O,F\}, \tag{8}$$

where O indicates that the cell is occupied by an object, and where F indicates that the cell is free from any object. Thus, the state of occupancy of a cell $o_t$ is binary. The tracker may estimate the cell's occupancy probability at a later time t+1, i.e., a posterior occupancy probability $p_{o,t+1}(o_{t+1})$ of the cell, based on the cell's occupancy probability at time t and measurement data $z_{t+1}$ for the later time t+1.

The tracker may be realized using a particle-based approach [8]. In this approach, each cell may comprise a number of particles. Each particle may have its own state X, which may comprise a two-dimensional position (e.g., x and z) and a two-dimensional velocity (e.g., $v_x$, $v_z$), such that $X=[x, z, v_x, v_z]$. The particles also have a weight parameter w associated with them. The particles may be used to approximate a posterior distribution of objects at the later time t+1. The particles may be independent of each other. Such independence may permit processing for the particles to take place in parallel for individual particles. Thus, graphics hardware (e.g., GPUs) may be used to execute a processing algorithm with massive parallelism.

According to some embodiments of the present technology, the tracker may perform the following operations:
  (a) Prediction of existing particles. In this operation, an existing set of particles for the time t is used to predict particles for the later time t+1 based on a process model. Weights of the existing set of particles remain unchanged for this operation.
  (b) Prediction of newborn particles. In this operation, newborn particles are sampled from a birth distribution $p_b(.)$ and new weights are created. The new weights may be controlled by a parameter $p_B$.
  (c) Particle update. In this operation, the weights of the predicted particles and the newborn particles are modified based on the measurement data $z_{t+1}$ for the later time t+1. The measurement data $z_{t+1}$ may be obtained from an output of the BEV conversion model. For example, a higher value for the occupancy evidence indicator $s_{ij}^a$ for a cell may enhance the weights associated with all particles in that cell, and the vice versa.
  (d) Resampling. In this operation, which may be a final operation of the tracker, particles are sampled. A probability of drawing a particle k for sampling is proportional to the particle's weight $w_k$. In some embodiments, a fixed number of particles are sampled. The resampling may function to remove particles that are unlikely to correspond to an object, thus reducing the occurrence of false positives or erroneous indications of an object.

Additional details regarding the operations of the tracker may be found in [8], which is incorporated by reference herein.

Conventional particle filters have struggled in real-time applications where fast processing of a large volume of data is required. A contributing factor to such struggles may be the costly computational resources required to process a large number of particles typically present in a region of interest for images used in vision systems for autonomous vehicles. To reduce the computational load, the Dempster-Shafer theory of evidence may be used to obtain an approximate version of the particle-based tracker [8]. This theory employs a probability hypothesis density/multi-instance Bernoulli (PHD/MIB) filter and therefore may be known as the DS-PHD/MIB filter in literature. A key difference between a particle-based tracker that uses a DS-PHD/MIB filter and one that does not use a DS-PHD/MIB filter is that, with the DS-PHD/MIB filter, the occupancy state of a grid cell is represented by a basic belief assignment (BBA) that assigns a mass m to each element of a universe $\Omega$ according to m: $2^\Omega \to [0, 1]$. For a universe comprising cells of a grid, $\Omega=\{O, F\}$. Thus, the state of a cell may be given by a mass for occupied m(O) and mass for free m(F). A pignistic transformation may be used to connect the masses m(O) and m(F) to determine a probability of occupancy $\mathcal{P}_{o,t}^{(c_{ij})}(O_t)$ for a cell $c_{ij}$ for time t, according to expression (9):

$$\mathcal{P}_{o,t}^{(c_{ij})}(O_t)=m_t^{(c_{ij})}(O_t)+0.5 \cdot (1-m_t^{(c_{ij})}(O_t)-m_t^{(c_{ij})}(F_t)). \quad (9)$$

Operations of the DS-PHD/MIB filter may be the same as the operations of the particle-based filter. Additional details may be found in [8]. The inventors have recognized and appreciated that a connection between the BEV conversion model and the DS-PHD/MIB filter is needed, especially with respect to the particle update operation, and have developed a sensor model. The sensor model may be used to connect the measurement z from the BEV conversion model to the masses m(O) and m(F) of the DS-PHD/MIB filter.

According to some embodiments of the present technology, the connection via the sensor model may be achieved in two steps: a first step that maps values obtained from the BEV conversion model to an occupancy probability for each cell in the BEV grid, and a second step that transforms the occupancy probability for each cell in the BEV grid to input for the DS-PHD/MIB filter.

Figure 7:
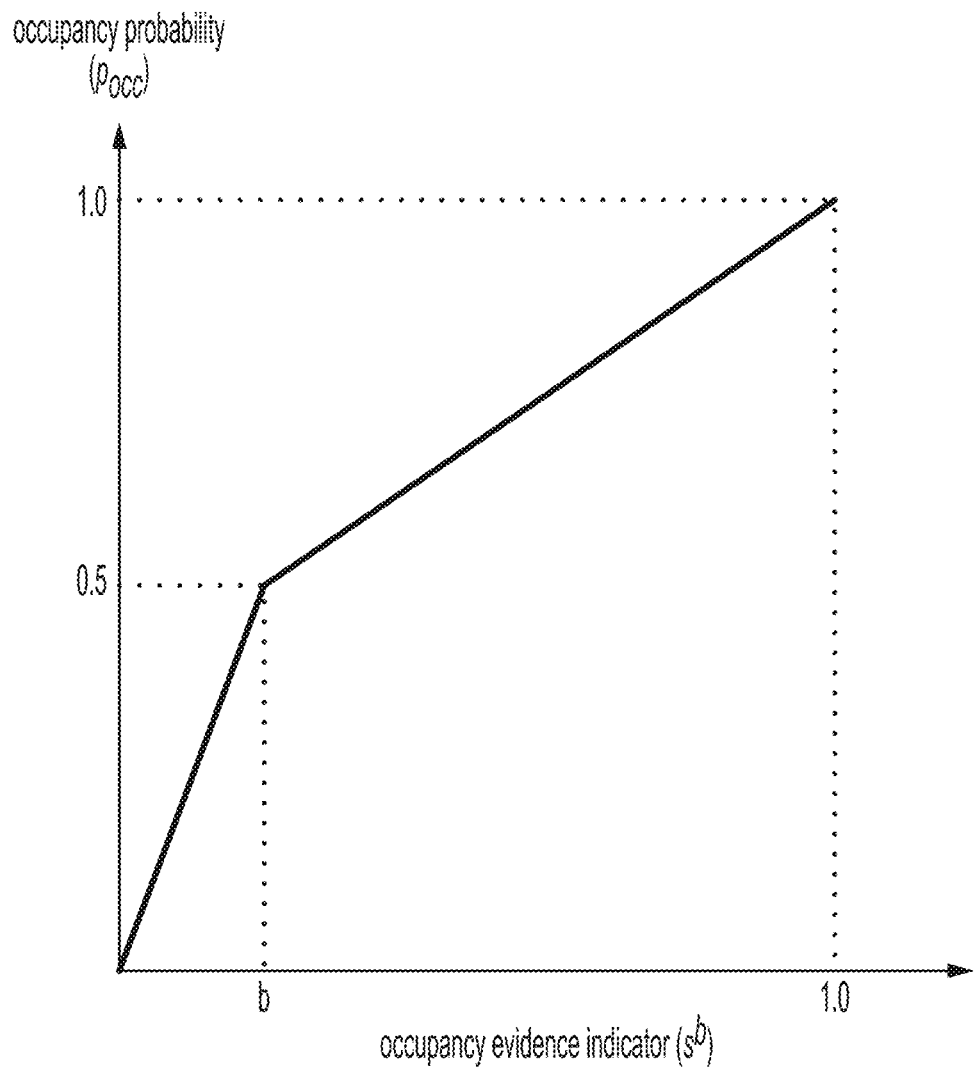
FIG. 7 shows an example of a piece-wise linear mapping chart, according to some embodiments of the present technology.

According to some embodiments of the present technology, for the first step, a piece-wise linear model may be used to map values of the occupancy evidence indicator matrix $S^b$ to an occupancy probability $p_{occ}$ for each cell in the grid, according to expression (10):

$$p_{occ} = \begin{cases} \frac{0.5}{b} \times s^b, & \text{if } s^b \leq b, \text{ or} \\ \frac{0.5}{1-b} \times (s^b - b) + 0.5, & \text{if } s^b > b, \end{cases} \quad (10)$$

where, b is a parameter corresponding to a value of the occupancy evidence indicator $s^b$ corresponding to a predetermined occupancy probability. Thus, b may be optimized or tuned empirically for the vision system. FIG. 7 shows an example of a piece-wise linear mapping chart set to a predetermined occupancy probability of 0.5. As shown in the chart, for values of the occupancy evidence indicator $s^b$ below b, a linear relationship between the occupancy evidence indicator $s^b$ and the occupancy probability $p_{occ}$ has a first slope while, for values of the occupancy evidence indicator $s^b$ above b, a linear relationship between the occupancy evidence indicator $s^b$ and the occupancy probability $p_{occ}$ has a second slope. A mapping of the occupancy evidence indicators $s^b$ of the BEV conversion model to the occupancy probability $p_{occ}$ may be used to connect measurement data z for a cell to masses m(O) and m(F) for the cell. In some embodiments, b may be determined based on a desired smallest size of an object to be detected. Thus, a relatively smaller value for b may be used to detect smaller objects in the environment of the vehicle. However, it may not be practical to use an extremely small value for b because a reduction in the value of b may result in an increased amount of data noise. Experimentally, the inventors have found a range of about 0.1 to about 0.5 (b∈[0.1, 0.5]) to be suitable for visions systems for autonomous vehicles.

According to some embodiments of the present technology, for the second step, the occupancy probability $p_{occ}$ may be transformed into the masses m(O) and m(F), which may serve as input to the DS-PHD/MIB filter in the particle update operation discussed above, according to expressions (11) and (12):

$$m(O)=2 \cdot p_{occ}-1, \text{ if } p_{occ} \geq 0.5 \text{ else } 0, \text{ and} \quad (11)$$

$$m(F)=1-2 \cdot p_{occ}, \text{ if } p_{occ} < 0.5 \text{ else } 0. \quad (12)$$

The sensor model may operate to ensure that no particles are created in regions where the occupancy probability $p_{occ}$ is below 0.5, because the mass m(O) would be 0 in that case.

A final output of the DS-PHD/MIB filter may be an occupancy state of each cell in the $M_X \times M_Z$ grid.

C. Grid-Cell Fusion

According to some embodiments of the present technology, grid cells that are determined to have a high occupancy probability and that are adjacent to each other may be fused or linked together to represent single object. For example, the cells corresponding to the rectangle 602 in FIG. 6A and may be fused or linked together and designated a single object, and the cells corresponding to the rectangle 604 in FIG. 6A and may be linked together and designated another single object. In some embodiments, linking or fusion of adjacent cells may be performed using known contour functions to aggregate cells together and to assess an overall velocity of the object formed by the fusion, by averaging all the cells in the object [9]. A result of grid-cell fusion may be an object map that provides an object-level understanding of the vehicle's surroundings in terms of locations of various objects and may even permit object identification.

D. Multi-Resolution Processing to Increase Update Rate

As noted above, an autonomous vehicle's reaction time to a hazardous object or obstacle in the vehicle's path may depend on the vehicle's speed and on distance from the vehicle to the obstacle. The closer the obstacle and/or the greater the vehicle's speed, the less reaction time is available for the vehicle's movement controller (e.g., the main system controller 30) has to compute one or more courses of action to avoid the obstacle, to decide a best course of action, and to output instructions to cause the vehicle to maneuver to avoid the obstacle. A greater amount of reaction time allows for smoother and safer movement of the vehicle around the obstacle. In contrast, insufficient reaction time may lead to excessive braking and/or swerving to avoid the obstacle, which may cause unwanted effects, such as unpredictable movements by nearby vehicles or pedestrians in response to the excessive braking and/or swerving.

The inventors have recognized and appreciated that frame rates of the camera sensors may be a parameter that can be manipulated to increase an update rate or a rate at which the vision system may output new data (e.g., a next object map) to the vehicle's movement controller. The inventors have recognized that objects that are relatively close to the vehicle may need a relatively higher frame rate whereas, for objects that are relatively far from the vehicle, a relatively lower frame rate may be sufficient. Reaction times for objects that are farther away may be longer, and therefore slower frame rates may be sufficient. For example, a car driving on a highway at 130 kilometers per hour (about 36 meters per second) may have a closing time of 277 milliseconds to an object that is 10 meters away and may have a closing time of 4.15 seconds to an object that is 150 m away. If actuation of the vehicle's braking system requires 0.200 milliseconds, then in the 10-meter case would require a frame rate of at least 1/77 milliseconds or 13 FPS. On the other hand, the 150-meter case would require a much lower frame rate of at least 1/3.95 seconds or 0.25 FPS.

The inventors have developed a technique to minimize computing resources by taking advantage of the different frame-rate requirements for obstacle avoidance at a long range (i.e., far-away objects) compared with a close range (i.e., nearby objects). According to some embodiments of the present technology, a pair of stereo images may be processed to account for fast updates at close ranges and slower updates at long ranges. In some embodiments, the camera sensors of the vision system may be operated at a high frame rate (e.g., 64 FPS), which may be the maximum frame rate of the camera sensors. Pixel data of images captured by the camera sensors are then downsampled into multiple lower-resolution images, which may be referred to as image pyramids. A relatively higher pyramid level may have lower-resolution images, i.e., the original images are converted to downsampled images having fewer pixels per image, whereas a lower pyramid level may have a relatively higher resolution. In some embodiment, for a lowest pyramid level, there may be no downsampling, such that the resolution of the original images as captured by the camera sensors is preserved. With fewer pixels, the downsampled images of the higher pyramid level may be processed into depth maps at higher frame rates than frame rates for downsampled images of relatively lower pyramid levels. In some embodiments, the downsampling may be performed by the stereo-data processing module 6A prior to generation of the depth map that is outputted to the BEV processing module 6C.

For example, for a three-level downsampling scheme, at the lowest pyramid level (pyr0), full-resolution images may be processed at 4 FPS; at an intermediate pyramid level (pyr1), half-resolution images may be processed at 16 FPS; and, at the highest pyramid level (pyr2), quarter-resolution images may be processed at 64 FPS. The half-resolution images may have half the number of pixels as the full-resolution images. Similarly, the quarter-level images may have one-fourth the number of pixels as the full-resolution images. Because computation time for generating a depth map typically may scale as a function of the number of pixels in the images, depth maps for the highest pyramid level (pyr2) may be generated at a frame rate that is 16-times faster than depth maps for the lowest pyramid level (pyr0). Stated differently, the particles described above may be updated at 64 FPS for the pyr2 depth map, 16 FPS for the pyr1 depth map, and 4 FPS for the pyr0 depth map. In this manner, closer objects may be processed faster (i.e., faster update rates) using lower-resolution depth maps, without significant loss of information because, in the captured images, same-sized objects will appear larger at close range and smaller at long range. In short, close-range objects, which may occupy a large fraction of the pixels of the original images from the camera sensors, need not be processed at full resolution, whereas long-range objects, which may be of significant size but may appear small in the original images due to their distance, are processed high resolution. In the example above for the three-level downsampling scheme, pyr2, i.e., the highest pyramid level, may be used to detect close-range objects; pyr1, i.e., the intermediate pyramid level, may be used to detect medium-range objects; and pyr0, i.e., the lowest pyramid level, may be used to detect far-range objects. As will be appreciated, more than three pyramid levels may be used, or only two pyramid levels may be used.

The downsampling techniques of the present technology may reduce computational requirements by a significant amount. For example, for close-range object detection, instead of performing a stereo matching process at a frequency of 20 Hz for 12-MP images the stereo matcher could run at a frequency of 4 Hz at 12 MP and at 32 FPS, i.e., at quarter resolution (pyr2), and still capture all objects of interest with enough latency for the vehicle to be controlled to move safely.

Figure 8:
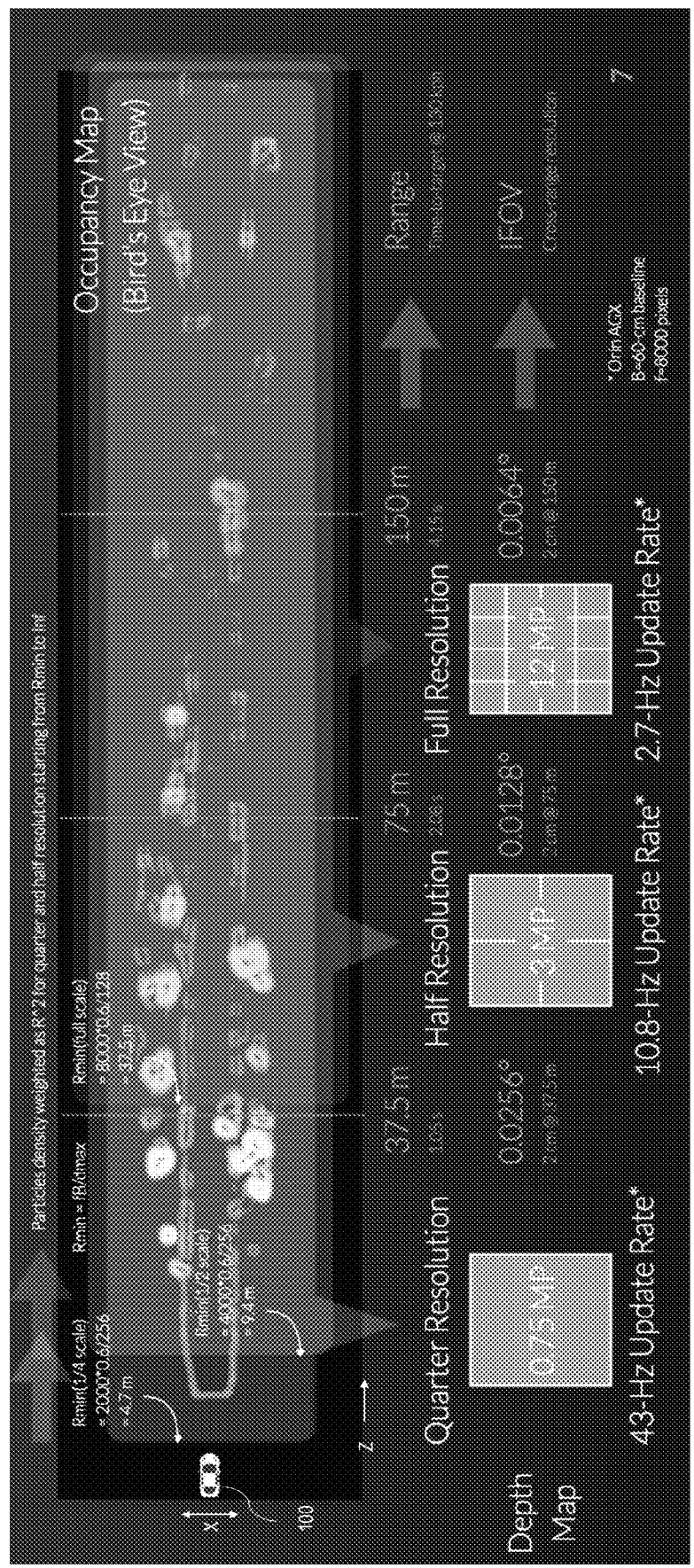
FIG. 8 shows an example of a BEV occupancy map produced from depth maps having multiple resolutions, according to some embodiments of the present technology.

FIG. 8 shows an example of a BEV occupancy map in which the update-rate enhancement techniques of the present technology have been used. The occupancy map may be the object map discussed above. In this example, the occupancy map was updated at a high frequency of 43 Hz for a close distance range of 0 meters up to 38 meters from the vehicle, at an intermediate frequency of 10.8 Hz for an intermediate distance range of 38 meters up to 75 meters from the vehicle, and at a low frequency of 2.7 Hz for a long distance range of 75 meters and above from the vehicle. At the close distance range, quarter-resolution downsampled images were used, corresponding to 0.75 MP images. At the intermediate distance range, half-resolution downsampled images were used, corresponding to 3 MP images. At the long distance range, full resolution images were used, corresponding to 12 MP images. Such range-based updating was found to result in sufficient reaction times to detect objects, because objects at close ranges require faster frame rates but, because the objects appear larger the image resolution need not be high. For example, as noted above a time-to-target to an object at a distance of 150 meters when the vehicle is travelling at 130 kph is 4.15 seconds; hence a full-resolution update at the lower frequency of 2.7 Hz is more than adequate.

Although the ranges shown in FIG. 8 appear to have no overlap, the depth maps for the quarter-resolution, half-resolution, and full-resolution depth maps may overlap. For example, the close distance range may extend from 0 meters up to 40 meters from the vehicle, the intermediate distance range may extend from 35 meters to 80 meters from the vehicle, and the long distance range may extend from of 70 meters and above from the vehicle. Point-cloud point densities for the point clouds generated from the quarter-resolution and half-resolution depth maps may be weighted as $R^{-2}$, such that fewer points may be present at longer ranges. In this manner, the quarter-resolution depth maps may contribute the most points close to the vehicle and also may be updated at the highest update rate, whereas the full-resolution depth maps may contribute the most points at long ranges but at lower update rates.

According to some embodiments of the present technology, depth maps of multiple different resolutions may be produced by the stereo-data processing module 6A and provided to the BEV processing module 6C for object detection and noise-reduction tracking, discussed above. In some embodiments, the stereo-data processing module 6A may produce multi-resolution point clouds that are provided to the BEV processing module 6C. In some embodiments, the BEV processing module 6C may obtain a full-resolution depth map from the stereo-data processing module 6A and may perform downsampling to produce depth maps of one or more lower resolutions.

Figure 9A:
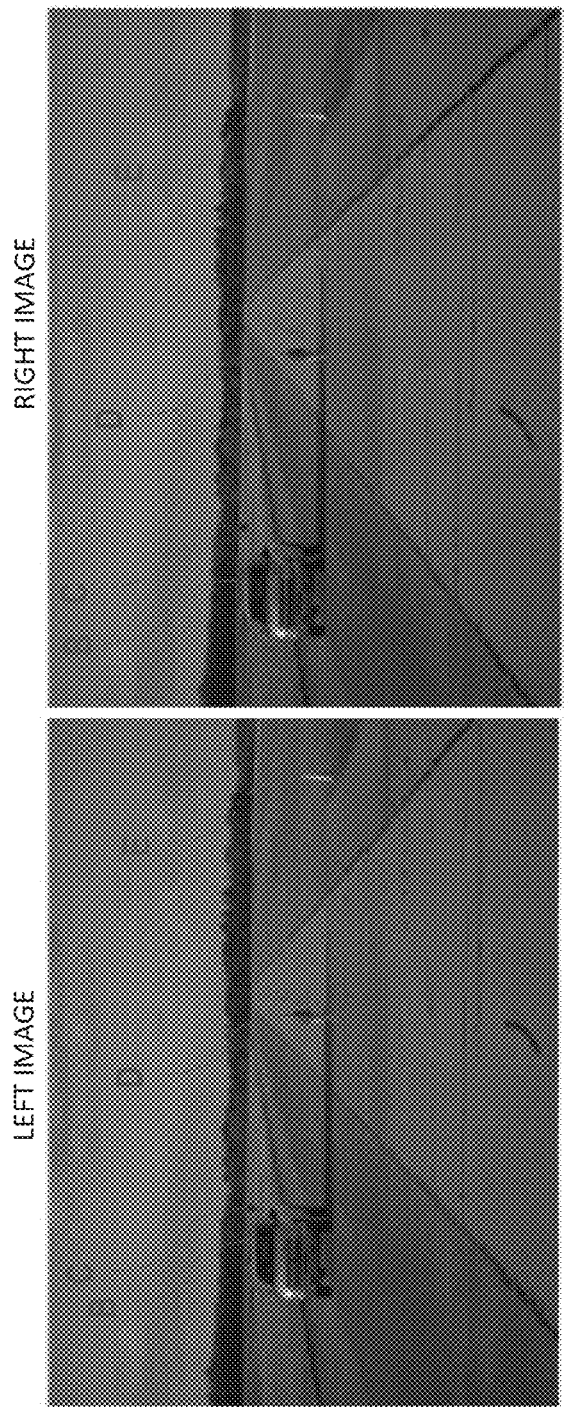
FIG. 9A shows left and right stereo images of a scene in which objects of various sizes are present on or near a runway.

A stereo vision system according to some embodiments of the present technology was used to detect small objects at an airport. FIG. 9A shows left and right stereo images of a scene in which objects of various sizes are present on or near a runway A. The left stereo image was captured by a left camera sensor of the stereo vision system, and the right image was captured the a right camera sensor of the stereo vision system. The stereo images were captured concurrently. The objects shown in the stereo images are, from left to right, a pickup truck B, a barrel C, a mannequin D, and a construction cone E. The pickup truck B, the barrel C, and the mannequin D are located on the runway A, and the construction cone E is located outside of the runway A. As will be appreciated, the objects are at different depths or distances from the camera sensors. That is, using the coordinate system depicted in FIG. 1, the objects are at different distances along the Z direction. In some embodiments, the stereo vision system may be mounted on a vehicle, in which case the distances to the objects may change depending on whether the vehicle and/or one or more of the objects is or are moving. In some embodiments, the stereo vision system may be mounted on a stationary structure (e.g., an observation tower), in which case the distances to the objects may change depending on whether one or more of the objects is or are moving.

Figure 9B:
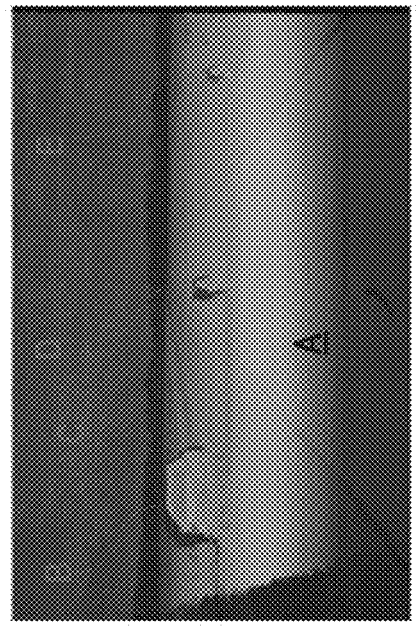
FIG. 9B shows a depth map generated for the stereo images of FIG. 9A.

FIG. 9B shows a depth map generated by the stereo vision system for the stereo images of FIG. 9A. The variations in shading or color correspond to variations in depth in the Z direction. The dark triangular region at the lower left of the depth map correspond to a region where pixels could not be matched between the left and right stereo images.

Figure 10A:
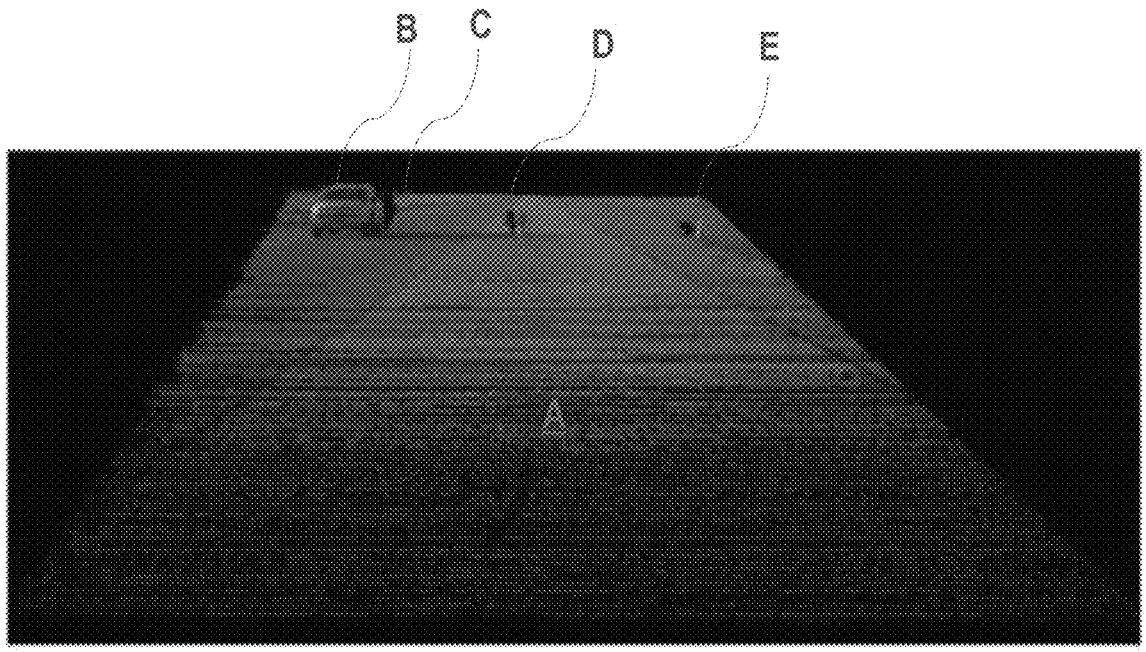
FIG. 10A shows a point cloud generated for the stereo images of FIG. 9A.
Figure 10B:
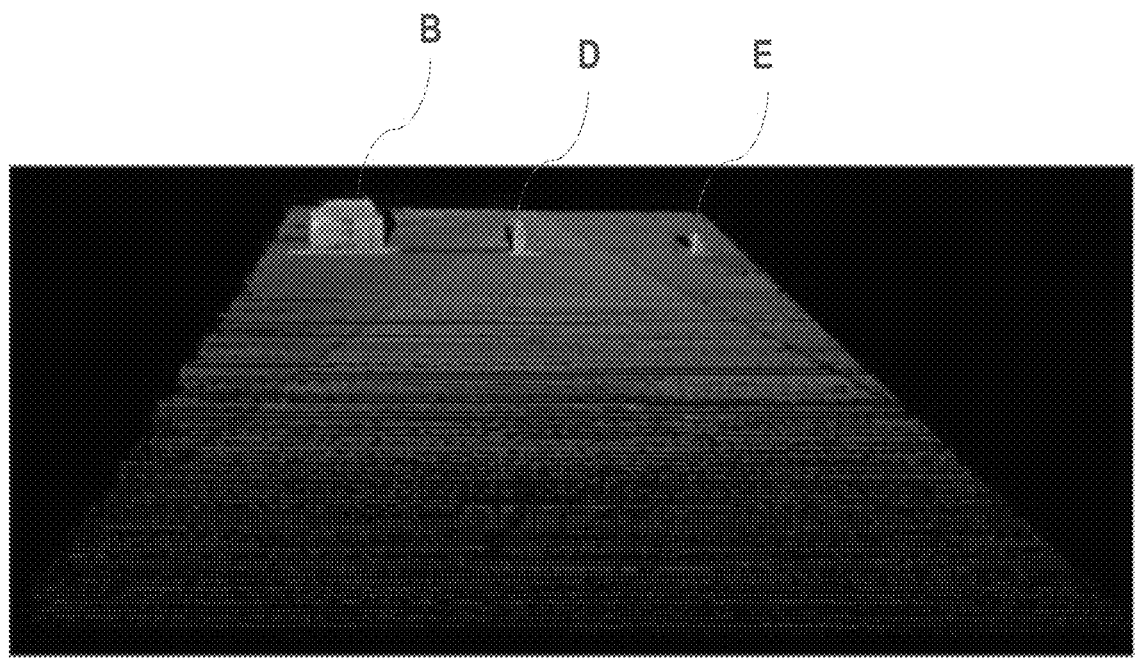
FIG. 10B shows the point cloud of FIG. 9A processed to detect and highlight the objects on the runway in FIG. 9A.

FIG. 10A shows a point cloud generated by the stereo vision system for the stereo images of FIG. 9A. FIG. 10B shows the point cloud processed to detect and highlight the objects on the runway A.

Figure 11:
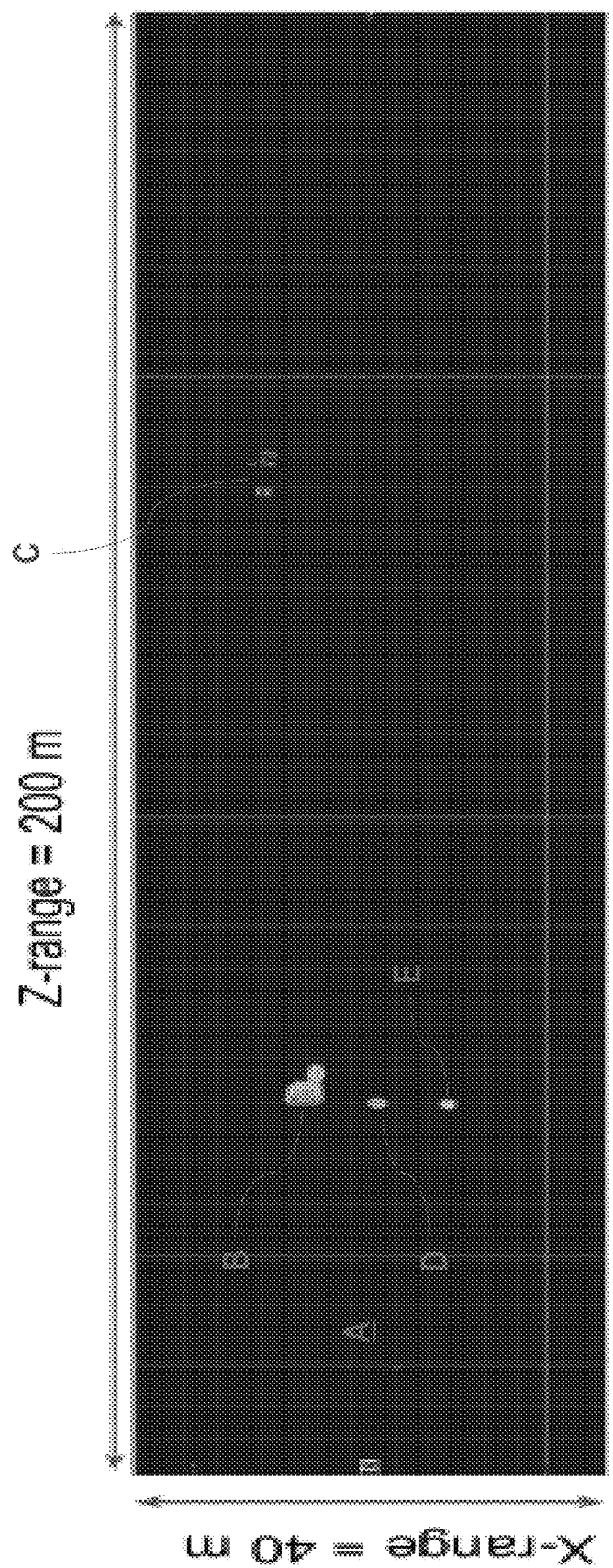
FIG. 11 shows a BEV image of the scene of the stereo images of FIG. 9A.

FIG. 11 shows a BEV image of the scene of the left and right stereo images. Each cell of the BEV image corresponds to a 20 cm×20 cm area. Regions of high intensity, i.e., regions that have high brightness, correspond to evidence of an obstacle. The BEV image of FIG. 11 clearly shows the relative depths or distances between the stereo vision system and the pickup truck B, the barrel C, the mannequin D, and the construction cone E. More specifically, the BEV image shows the pickup truck B, the mannequin D, and the construction cone E to be located at about the same distance away in the Z direction while the barrel C is located relatively farther away in the Z direction. As can be seen by comparing FIGS. 9B and 11, the BEV image may provide an easier way to visually quantify distances to objects by eliminating the need to understand how variations in shading or color correspond to variations in distance, which would be necessary for interpreting objects appearing in a depth map.

Figure 12:
FIG. 12 shows a photograph of objects positioned on a runway for a detection experiment.

FIG. 12 shows an photograph of objects positioned on the runway A. The objects have various shapes and sizes and are spaced apart at a spacing of about 6 meters in the X direction at a same Z-direction distance. The objects include a child mannequin a in a standing position, a car (pickup truck) b, a barrel c, a construction cone d, a tire e, a piece of lumber f, a cinder block g, a suitcase h, an adult mannequin i in a lying-down position, and a portion (triangular wedge) of a curb ramp j. The objects spanned a total width in the X direction of about 60 meters. Table 1 shows dimensions of the nine objects.

TABLE 1

Detected Objects

| Object | Dimensions (approximate) |
|---|---|
| a - child mannequin (standing) | 30 cm shoulder width × 110 cm height |
| b - car (pickup truck) | 595 cm length × 205 cm width × 195 cm height |
| c - barrel | 100 cm height × 50 cm diameter |
| d - construction cone | 70 cm height × 25 cm base width |
| e - tire | 25 cm width × 60 cm diameter |
| f - lumber | 12 cm width × 9 cm height × 60 cm length |
| g - cinder block | 20 cm width × 20 cm height × 40 cm length |
| h - suitcase | 45 cm width × 35 cm height × 60 cm length |
| i - adult mannequin (lying down) | 38 cm shoulder width × 175 cm height |
| j - curb ramp (triangular wedge) | 16 cm height × 50 cm width × 35 cm length |

When the stereo vision system was mounted on a vehicle traveling on the runway in the Z direction, all of the objects were in the field of view and detected at distances as far away as about 500 meters to about 140 meters, at which point the field of view of the camera sensors begins to narrow such that outer ones of the objects being to fall out of the field of view. At a distance of about 30 meters, only a single one of the objects is within the field of view. In short, it was found that the stereo vision system, while mounted on a moving vehicle, was able to detect and track large and small objects until the objects left the field of view of the camera sensors of the stereo vision system. Such detection and tracking was repeated for a total of nine runs, with the stereo vision system producing repeatable results.

A vision system for detecting and tracking objects in stereo-vision images, according to the technology described herein, may be embodied in different configurations. Example configurations include combinations of configurations (1) through (54), as follows:

(1) A vision system for detecting and tracking objects in stereo-vision images, the system comprising:
  at least one computer processor coupled to a memory, the at least one computer processor being configured to:
  (a) obtain point-cloud data captured by stereo-vision camera sensors on a vehicle as the vehicle travels along a road surface, wherein:
    the point-cloud data comprises image data and depth data of an image captured at a time $t_n$,
    the image comprises objects imaged along an imaging direction oriented parallel to or approximately parallel to a road surface,
    the point-cloud data corresponds data of points of a point cloud P, and
    the points of the point cloud correspond to pixels of the image;
  (b) compress the point-cloud data to bird's-eye-view (BEV) data representing a view along a BEV direction oriented approximately perpendicular to the road surface, the BEV data representing the objects on a BEV plane oriented approximately parallel the road surface;
  (c) establish a grid of cells for the BEV plane, wherein:
    each cell of the grid comprises occupancy data corresponding to a likelihood that at least one of the objects is present at a position corresponding to the cell,
    each cell of the grid covers a predetermined area of the BEV plane, the BEV plane encompasses regions at distances in a range from 1 m or less to 200 m or more from the vehicle;

(d) for each cell of the grid, determine occupancy values of the cell for the time t, and perform noise reduction by assigning weights to the cell based on predicted occupancy values of the cell for the time $t_n$ and on occupancy values of the cell for a previous time $t_{n-1}$, and (e) output to a controller of the vehicle, in real time or nearly real time to the time $t_n$, an occupancy evidence map based on the occupancy values of the cells of the grid for the time $t_n$, the occupancy evidence map comprising a set of tracked objects of the objects in the image.

(2) The system of configuration (1), wherein the at least one computer processor is further configured to:

(f1) perform a tracking update by setting the occupancy values of the cells of the grid for the time $t_n$ to be the occupancy values of the cells of the grid at the previous the time $t_{n-1}$, and repeating (a) through (e).

(3) The system of configuration (1) or configuration (2), wherein the at least one computer processor is further configured to:

(f2) perform a tracking update by incrementing n and repeating (a) through (e).

(4) The system of any one of configurations (1) through (3), wherein:

each cell of the grid comprises a plurality of particles, and in (d), the weights are assigned to the particles of the cell for the time $t_n$ based on the occupancy values of the cell for the previous time $t_{n-1}$.

(5) The system of any one of configurations (1) through (4), wherein the at least one computer processor is further configured to, in (d), determine occupancy values of the cell for a posterior time $t_{n+1}$ prior to obtaining point-cloud data for an image captured at the posterior time $t_{n+1}$.

(6) The system of any one of configurations (1) through (5), wherein the occupancy values of the cells of the grid for the previous time $t_{n-1}$ are cached and are not stored in nonvolatile memory.

(7) The system of any one of configurations (1) through (6), wherein, in (d), the weights assigned to the cell:

cause the occupancy values of the cell for the time $t_n$ to be lower than the predicted occupancy values of the cell for the time $t_n$, if the occupancy values of the cell for the previous time $t_{n-1}$ indicate an absence of an object in the cell, and cause the occupancy values of the cell for the time $t_n$ to be equal to higher than the predicted occupancy values of the cell for the time $t_n$, if the occupancy values of the cell for the previous time $t_{n-1}$ indicate a presence of an object in the cell.

(8) The system of any one of configurations (1) through (7), wherein each cell of the grid corresponds to:

at least 50 points of the point cloud, or
at least 100 points of the point cloud, or
at least 500 points of the point cloud, or
at least 1000 points of the point cloud, or
at least 5000 points of the point cloud, or
at least 10,000 points of the point cloud.

(9) The system of any one of configurations (1) through (8), wherein:

the grid comprises n cells, where n is in a range of:
10,000 to 50,000, or
40,000 to 100,000, or
90,000 to 200,000, or
150,000 to 300,000, or
250,000 to 400,000, or
350,000 to 500,000, or
500,000 to 1,000,000, and in (b), the compressing compresses the point-cloud data corresponding to at least 3 million points to the n cells of the grid.

(10) The system of any one of configurations (1) through (9), wherein, for each cell of the grid:

the occupancy values of the cell for the time t are associated with particles of the cell, the particles of the cell are independent of each other, and the particles of the cell each comprise multi-dimensional positional parameters and multi-dimensional velocity parameters.

(11) The system of any one of configurations (1) through (10), wherein, for each cell of the grid, the particles have respective weights.

(12) The system of any one of configurations (1) through (11), wherein:

an image plane of the image data comprises an XZ plane extending in an X direction and a Z direction, the imaging direction extends parallel to a Y direction, the point cloud is a three-dimensional point cloud comprising a set of points P, where:

$P = \{(x_k, y_k, z_k)\}$, k is a natural number, $x_k$ corresponds to an X-direction value in the point cloud, $y_k$ corresponds to a Y-direction value in the point cloud, and $z_k$ corresponds to a Z-direction value in the point cloud, in (b), the compressing of the point-cloud data to the BEV data comprises dividing the XZ plane into $M_X$ intervals in the X-direction and $M_Z$ intervals in the Z-direction, such that:

an i-th interval along an X direction of the XZ plane is given by $[x_{i-1}, x_i)$, a j-th interval along a Z direction of the XZ plane is given by $[z_{j-1}, z_j)$, $x_0, x_{Mx}, z_0, z_{Mz}$ correspond to $X_{min}, X_{max}, Z_{min}, Z_{max}$, respectively, and each cell of the grid is denoted by $c_{ij}$ and comprises a plurality of points $P_{ij}$ given by $P_{ij} = \{(x_k, y_k, z_k)\}$ if $x_{i-1} \leq x_k < x_i$ and $z_{j-1} \leq z_k < z_j$.

(13) The system of any one of configurations (1) through (12), wherein the at least one computer processor is further configured to:

create a histogram H for the grid, the histogram H comprising histogram values $h_{ij}$, where, for each cell of the grid, the points $P_{ij}$ of the cell are weighted proportionally to a square of a distance to the camera sensors, according to $$h_{ij} = \Sigma_k z_k \times z_k,$$

for all $(x_k, y_k, z_k)$ that are points $P_{ij}$ in the XZ plane, and normalize the histogram H to create a normalized histogram $\hat{H}$ having normalized histogram values $\hat{h}_{ij}$ in a range from 0 to 1, according to:

$$\hat{h}_{ij} = \frac{h_{ij}}{h},$$

where $h = \Sigma_{i,j} h_{ij}$.

(14) The system of any one of configurations (1) through (13), wherein the at least one computer processor is further configured to:

determine a preliminary occupancy indicator $S^a$ by determining a preliminary occupancy parameter $s_{ij}^a$ for each cell of the grid, indicating a likelihood of an object being in the cell, the preliminary occupancy parameter $s_{ij}^a$ being determined by imposing a saturation function $f(x)$ on the histogram values $h_{ij}$ of the histogram H, according to:

$$s_{ij}^a = f\left(\frac{h_{ij}}{\sigma_a}\right),$$

where the saturation function $f(x)$ is given by:

$$f(x) = \frac{1-e^{-x}}{1+e^{-x}},$$

and where $\sigma_a$ corresponds to a first steepness parameter.

(15) The system of any one of configurations (1) through (14), wherein the first steepness parameter $\sigma_a$ is determined such that the preliminary occupancy indicator $S^a$ has a maximum value in a range of 0.75 to 0.95.

(16) The system of any one of configurations (1) through (15), wherein the at least one computer processor is further configured to:

filter the preliminary occupancy parameters $s_{ij}^a$ for the cells of the grid to smooth regions corresponding to a road surface and to differentiate regions corresponding to objects.

(17) The system of any one of configurations (1) through (16), wherein, to filter the preliminary occupancy parameters $s_{ij}^a$ a filter is applied to emphasize abrupt changes in the preliminary occupancy parameters $s_{ij}^a$ to differentiate object borders.

(18) The system of any one of configurations (1) through (17), wherein to filter the preliminary occupancy parameters $s_{ij}^a$ a Sobel filter is applied to emphasize abrupt changes in the preliminary occupancy parameters $s_{ij}^a$ to differentiate object borders.

(19) The system of any one of configurations (1) through (18), wherein an abrupt change of at least 15% in the preliminary occupancy parameters $s_{ij}^a$ of adjacent cells indicates an object border.

(20) The system of any one of configurations (1) through (19), wherein application of the Sobel filter comprises, for each cell of the grid, performing Gaussian smoothing and differentiation in the X direction and the Z direction, by:

determining an X-direction gradient $G_X$ of the preliminary occupancy indicator $S^a$, determining a Z-direction gradient $G_Z$ of the preliminary occupancy indicator $S^a$, and determining an overall gradient G by combining the X-direction gradient $G_X$ and the Z-direction gradient $G_Z$, according to:

$$G = \frac{|G_x| + |G_z|}{2}.$$

(21) The system of any one of configurations (1) through (20), wherein:

the X-direction gradient $G_X$ for a cell of the grid is determined by correlating an X-direction kernel $K_X$ of the cell with the preliminary occupancy indicator $S^a$ using a correlation operation $\otimes$, according to:

$$G_x = K_x \otimes S^a,$$

and the Z-direction gradient $G_Z$ for the cell is determined by correlating a Z-direction kernel $K_Z$ of the cell with the preliminary occupancy indicator $S^a$ using the correlation operation $\otimes$, according to:

$$G_z = K_z \otimes S^a.$$

(22) The system of any one of configurations (1) through (21), wherein the at least one computer processor is further configured to:

determine an occupancy evidence indicator $S^b$ by determining, for each cell of the grid, an occupancy evidence parameter $s_{ij}^b$ indicating a normalized likelihood of an object being in the cell, the occupancy evidence parameter $s_{ij}^b$ being determined by imposing a saturation function $f(x)$ on gradient values $g_{ij}$ of the overall gradient G, to scale the occupancy evidence parameters $s_{ij}^b$ to have values in a range from 0 to 1, according to:

$$s_{ij}^b = f(g_{ij}/\sigma_b),$$

where $\sigma_b$ corresponds to a second steepness parameter.

(23) The system of any one of configurations (1) through (22), wherein the second steepness parameter $\sigma_b$ is determined such that the occupancy evidence indicator $S^b$ has a maximum value in a range of 0.75 to 0.95.

(24) The system of any one of configurations (1) through (23), wherein:

for each cell of the grid, a state of occupancy of the cell $o(t_{n+1})$ at a time $t_{n+1}$ is free (F) or is occupied (O), wherein a free (F) cell is a cell that is not occupied by an object, and wherein an occupied (O) cell is a cell occupied by at least one object, in (d), the noise reduction is performed by, for each cell of the grid, estimating a posterior occupancy probability $p_o(t_{n+1})$ for a time $t_{n+1}$ based on an occupancy probability $p_o(t_n)$ for the time $t_n$ and an occupancy evidence indicator $S^b(t_{n+1})$ for the time $t_{n+1}$.

(25) The system of any one of configurations (1) through (24), wherein the occupancy evidence indicator $S^b(t_{n+1})$ for the time for $t_{n+1}$ is obtained from the occupancy evidence indicator $S^b$.

(26) The system of any one of configurations (1) through (25), wherein, in (d), the noise reduction is performed by, for each cell of the grid, representing the state of occupancy of the cell $o(t_{n+1})$ for the time $t_{n+1}$ with a plurality of multi-dimensional particles representing characteristics of portions of the cell.

(27) The system of any one of configurations (1) through (26), wherein:

each of the particles comprises a state X that changes with time, for each particle, the state X for the time $t_n$ comprises an X-position component x, a Z-position component z, an X-direction velocity component $v_x$, and a Z-direction velocity component $v_z$, such that $X=[x, z, v_x, v_z]$, the particles are associated with respective weight parameters w, and the particles are independent of each other.

(28) The system of any one of configurations (1) through (27), wherein the posterior occupancy probability $p_{o,t}$ for a cell $c_{ij}$ at a time t is estimated by estimating a probabilistic value according to:

$$p_{o,t}^{(cij)}(O_t) = m_t^{(cij)}(O_t) + 0.5 \cdot (1 - m_t^{(cij)}(O_t) - m_t^{(cij)}(F_t)).$$

where:
m(O) represents a cell mass of a cell that is occupied by an object, and
m(F) represents a cell mass of a cell that is not occupied by an object.

(29) The system of any one of configurations (1) through (28), wherein:

$m(O)=2 \cdot p_{occ}-1$, if $p_{occ} \geq 0.5$ else 0, $m(F)=1-2 \cdot p_{occ}$, if $p_{occ} < 0.5$ else 0, $p_{occ}$ is an occupancy factor selected based on a desired object characteristic, and in (d), m(O) and m(F) are provided as input to a tracker as noise-reduction parameters.

(30) The system of any one of configurations (1) through (29), wherein $p_{occ}$ is selected based on a minimum dimension of an object to be tracked.

(31) The system of any one of configurations (1) through (30), wherein $p_{occ}$ is determined according to:

$$p_{occ} = \begin{cases} \frac{0.5}{b} \times S^b, & \text{if } S^b \leq b, \text{ or} \\ \frac{0.5}{1-b} \times (S^b - b) + 0.5, & \text{if } S^b > b, \end{cases}$$

where b is a parameter that minimizes noise for a desired minimum dimension of an object to be tracked.

(32) The system of any one of configurations (1) through (31), wherein b has a value in a range from 0.1 to 0.5.

(33) The system of any one of configurations (1) through (32), wherein the minimum dimension is 10 cm.

(34) The system of any one of configurations (1) through (33), wherein the at least one computer processor is further configured to:
for each tracked object of the set of tracked objects, determine an overall velocity of the tracked object by computing an average velocity for a group of the cells of the grid occupied by the object.

(35) The system of any one of configurations (1) through (34), wherein, in (c), the grid is established to be a range-based grid based on a plurality of distance ranges of the depth data of the image.

(36) The system of any one of configurations (1) through (35), wherein:
cells of the grid corresponding to a first distance range have a first area, and
cells of the grid corresponding to a second distance range have a second area smaller than the first area.

(37) The system of any one of configurations (1) through (36), wherein:
a first portion of the point-cloud data corresponding to the first distance range has a first resolution, and
a second portion of the point-cloud data corresponding to the second distance range has a second resolution higher than the first resolution.

(38) The system of any one of configurations (1) through (37), wherein cells corresponding to a third distance range have a third area smaller than the second area.

(39) The system of any one of configurations (1) through (38), wherein a third portion of the point-cloud data corresponding to the third distance range has a third resolution higher than the second resolution.

(40) The system of any one of configurations (1) through (39), wherein:
the first distance range is a close range of up to about 30 m from the vehicle,
the second distance range is a medium range of about 30 m to about 70 m from the vehicle, and
the third distance range is a far range of about 70 m and greater from the vehicle.

(41) The system of any one of configurations (1) through (40), wherein cells of the grid corresponding to a distance range farthest from the vehicle each have an area of 50 cm×50 cm or smaller.

(42) The system of any one of configurations (1) through (41), wherein:
a first portion of the point-cloud data corresponding to a first distance range has a first resolution,
a second portion of the point-cloud data corresponding to a second distance range has a second resolution higher than the first resolution, and
a third portion of the point-cloud data corresponding to a third distance range has a third resolution higher than the second resolution.

(43) The system of any one of configurations (1) through (42), wherein:
the first resolution is in a range of 0.5 megapixels to 4 megapixels,
the second resolution is in a range of 3 megapixels to 9 megapixels, and
the third resolution is 8 megapixels or greater.

(44) The system of any one of configurations (1) through (43), wherein:
the first resolution is in a range of 0.5 megapixels to 1.5 megapixels,
the second resolution is in a range of 2 megapixels to 4 megapixels, and
the third resolution is in a range of 10 megapixels to 15 megapixels.

(45) The system of any one of configurations (1) through (44), wherein the occupancy evidence map comprises a BEV occupancy evidence map having:
a first resolution corresponding to the first distance range,
a second resolution corresponding to the second distance range, the second resolution being higher than the first resolution, and
a third resolution corresponding to the third distance range, the third resolution being higher than the second resolution.

(46) The system of any one of configurations (1) through (45), wherein:
the image is a stereo image corresponding to a frame of video sequence captured by the camera sensors at the time $t_n$, and
to determine relative movement of the set of tracked objects, (a) through (e) are repeated every m frames of the video sequence, where $1 \leq m \leq 100$.

(47) The system of any one of configurations (1) through (46), wherein $1 \leq m \leq 50$.

(48) The system of any one of configurations (1) through (47), wherein m=1, or m=5, or m=10, or m=20, or m=25.

(49) The system of any one of configurations (1) through (48), wherein:
for a first portion of the point-cloud data corresponding to a first distance range, (a) through (e) are processed at a first frame rate,
for a second portion of the point-cloud data corresponding to a second distance range, (a) through (e) are processed at a second frame rate lower than the first frame rate.

(50) The system of any one of configurations (1) through (49), wherein, for third portion of the point-cloud data corresponding to a third distance range, (a) through (e) are processed at a third frame rate lower than the second frame rate.

(51) The system of any one of configurations (1) through (50), wherein:
the second frame rate is half the first frame rate, and
the third frame rate is half the second frame rate.

(52) The system of any one of configurations (1) through (51), wherein edge portions of adjacent distance ranges overlap.

(53) The system of any one of configurations (1) through (52), wherein:
the occupancy evidence map comprises a first region corresponding to the first distance range, a second region corresponding to the second distance range, and a third region corresponding to third distance range, and the occupancy evidence map is outputted at a first update rate, with the first region comprising data updated at the first update rate, with the second region comprising data updated at a second update rate lower than the first update rate, and with the third region comprising data updated at a third update rate lower than the second update rate.

(54) The system of any one of configurations (1) through (53), wherein:
the first update rate is in a range from 40 Hz to 45 Hz,
the second update rate is in a range from 10 Hz to 15 Hz, and
the third update rate is in a range from 1 Hz to 5 Hz.

A method of detecting and tracking objects in stereo-vision images, according to the technology described herein, may be include various processes. Example methods include combinations of processes (55) through (108), as follows:

(55) A method of detecting and tracking objects in stereo-vision images, the method comprising:
(a) obtaining point-cloud data captured by stereo-vision camera sensors on a vehicle as the vehicle travels along a road surface, wherein:
the point-cloud data comprises image data and depth data of an image captured at a time $t_n$,
the image comprises objects imaged along an imaging direction oriented parallel to or approximately parallel to a road surface,
the point-cloud data corresponds data of points of a point cloud P, and
the points of the point cloud correspond to pixels of the image;
(b) compressing the point-cloud data to bird's-eye-view ("BEV") data representing a view along a BEV direction oriented approximately perpendicular to the road surface, the BEV data representing the objects on a BEV plane oriented approximately parallel the road surface;
(c) establishing a grid of cells for the BEV plane, wherein:
each cell of the grid comprises occupancy data corresponding to a likelihood that at least one of the objects is present at a position corresponding to the cell,
each cell of the grid covers a predetermined area of the BEV plane,
the BEV plane encompasses regions at distances in a range from 1 m or less to 200 m or more from the vehicle;
(d) for each cell of the grid, determining occupancy values of the cell for the time t, and performing noise reduction by assigning weights to the cell based on predicted occupancy values of the cell for the time $t_n$ and on occupancy values of the cell for a previous time $t_{n-1}$, and
(e) outputting to a controller of the vehicle, in real time or nearly real time to the time $t_n$, an occupancy evidence map based on the occupancy values of the cells of the grid for the time $t_n$, the occupancy evidence map comprising a set of tracked objects of the objects in the image.

(56) The method of process (55), further comprising:
(f1) performing a tracking update by setting the occupancy values of the cells of the grid for the time $t_n$ to be the occupancy values of the cells of the grid at the previous the time $t_{n-1}$, and repeating (a) through (e).

(57) The method of process (55) or process (56), further comprising:
(f2) performing a tracking update by incrementing n and repeating (a) through (e).

(58) The method of any one of processes (55) through (57), wherein:
each cell of the grid comprises a plurality of particles, and
in (d), the weights are assigned to the particles of the cell for the time $t_n$ based on the occupancy values of the cell for the previous time $t_{n-1}$.

(59) The method of any one of processes (55) through (58), further comprising, in (d), determining occupancy values of the cell for a posterior time $t_{n+1}$ prior to obtaining point-cloud data for an image captured at the posterior time $t_{n+1}$.

(60) The method of any one of processes (55) through (59), wherein the occupancy values of the cells of the grid for the previous time $t_{n-1}$ are cached and are not stored in nonvolatile memory.

(61) The method of any one of processes (55) through (60), wherein, in (d), the weights assigned to the cell:
cause the occupancy values of the cell for the time $t_n$ to be lower than the predicted occupancy values of the cell for the time $t_n$, if the occupancy values of the cell for the previous time $t_{n-1}$ indicate an absence of an object in the cell, and
cause the occupancy values of the cell for the time $t_n$ to be equal to higher than the predicted occupancy values of the cell for the time $t_n$, if the occupancy values of the cell for the previous time $t_{n-1}$ indicate a presence of an object in the cell.

(62) The method of any one of processes (55) through (61), wherein each cell of the grid corresponds to:
at least 50 points of the point cloud, or
at least 100 points of the point cloud, or
at least 500 points of the point cloud, or
at least 1000 points of the point cloud, or
at least 5000 points of the point cloud, or
at least 10,000 points of the point cloud.

(63) The method of any one of processes (55) through (62), wherein:
the grid comprises n cells, where n is in a range of:
10,000 to 50,000, or
40,000 to 100,000, or
90,000 to 200,000, or
150,000 to 300,000, or
250,000 to 400,000, or
350,000 to 500,000, or
500,000 to 1,000,000, and
in (b), the compressing compresses the point-cloud data corresponding to at least 3 million points to the n cells of the grid.

(64) The method of any one of processes (55) through (63), wherein, for each cell of the grid:
- the occupancy values of the cell for the time $t_n$ are associated with particles of the cell,
- the particles of the cell are independent of each other, and
- the particles of the cell each comprise multi-dimensional positional parameters and multi-dimensional velocity parameters.

(65) The method of any one of processes (55) through (64), wherein, for each cell of the grid, the particles have respective weights.

(66) The method of any one of processes (55) through (67), wherein:
- an image plane of the image data comprises an XZ plane extending in an X direction and a Z direction,
- the imaging direction extends parallel to a Y direction,
- the point cloud is a three-dimensional point cloud comprising a set of points P, where:
  - $P=\{(x_k, y_k, z_k)\}$,
  - k is a natural number,
  - $x_k$ corresponds to an X-direction value in the point cloud,
  - $y_k$ corresponds to a Y-direction value in the point cloud, and
  - $z_k$ corresponds to a Z-direction value in the point cloud,
- in (b), the compressing of the point-cloud data to the BEV data comprises dividing the XZ plane into $M_X$ intervals in the X-direction and $M_Z$ intervals in the Z-direction, such that:
  - an i-th interval along an X direction of the XZ plane is given by $[x_{i-1}, x_i)$,
  - a j-th interval along a Z direction of the XZ plane is given by $[z_{j-1}, z_j)$,
  - $x_0$, $x_{Mx}$, $z_0$, $z_{Mz}$ correspond to $X_{min}$, $X_{max}$, $Z_{min}$, $Z_{max}$, respectively, and
  - each cell of the grid is denoted by $c_{ij}$ and comprises a plurality of points $P_{ij}$ given by $P_{ij}=\{(x_k, y_k, z_k)\}$ if $x_{i-1} \le x_k < x_i$ and $z_{j-1} \le z_k < z_j$.

(67) The method of any one of processes (55) through (66), further comprising:
- creating a histogram H for the grid, the histogram H comprising histogram values $h_{ij}$, where, for each cell of the grid, the points $P_{ij}$ of the cell are weighted proportionally to a square of a distance to the camera sensors, according to $$h_{ij} = \Sigma_k z_k \times z_k,$$

for all $(x_k, y_k, z_k)$ that are points $P_{ij}$ in the XZ plane, and
- normalizing the histogram H to create a normalized histogram $\hat{H}$ having normalized histogram values $\hat{h}_{ij}$ in a range from 0 to 1, according to:

$$\hat{h}_{ij} = \frac{h_{ij}}{h},$$

where $h = \Sigma_{i,j} h_{ij}$.

(68) The method of any one of processes (55) through (67), further comprising:
- determining a preliminary occupancy indicator $S^a$ by determining a preliminary occupancy parameter $s_{ij}^a$ for each cell of the grid, indicating a likelihood of an object being in the cell, the preliminary occupancy parameter $s_{ij}^a$ being determined by imposing a saturation function $f(x)$ on the histogram values $h_{ij}$ of the histogram H, according to:

$$s_{ij}^a = f\left(\frac{h_{ij}}{\sigma_a}\right),$$

where the saturation function $f(x)$ is given by:

$$f(x) = \frac{1-e^{-x}}{1+e^{-x}},$$

and where $\sigma_a$ corresponds to a first steepness parameter.

(69) The method of any one of processes (55) through (68), wherein the first steepness parameter $\sigma_a$ is determined such that the preliminary occupancy indicator $S^a$ has a maximum value in a range of 0.75 to 0.95.

(70) The method of any one of processes (55) through (69), further comprising:
- filtering the preliminary occupancy parameters $s_{ij}^a$ for the cells of the grid to smooth regions corresponding to a road surface and to differentiate regions corresponding to objects.

(71) The method of any one of processes (55) through (70), wherein the filtering of the preliminary occupancy parameters $s_{ij}^a$ comprises applying a filter to emphasize abrupt changes in the preliminary occupancy parameters $s_{ij}^a$ to differentiate object borders.

(72) The method of any one of processes (55) through (71), wherein the filtering of the preliminary occupancy parameters $s_{ij}^a$ comprises applying a Sobel filter to emphasize abrupt changes in the preliminary occupancy parameters $s_{ij}^a$ to differentiate object borders.

(73) The method of any one of processes (55) through (72), wherein an abrupt change of at least 15% in the preliminary occupancy parameters $s_{ij}^a$ of adjacent cells indicates an object border.

(74) The method of any one of processes (55) through (73), wherein the applying of the Sobel filter comprises, for each cell of the grid, performing Gaussian smoothing and differentiation in the X direction and the Z direction, by:
- determining an X-direction gradient $G_X$ of the preliminary occupancy indicator $S^a$,
- determining a Z-direction gradient $G_Z$ of the preliminary occupancy indicator $S^a$, and
- determining an overall gradient G by combining the X-direction gradient $G_X$ and the Z-direction gradient $G_Z$, according to:

$$G = \frac{|G_x| + |G_z|}{2}.$$

(75) The method of any one of processes (55) through (74), wherein:
- the X-direction gradient $G_X$ for a cell of the grid is determined by correlating an X-direction kernel $K_X$ of the cell with the preliminary occupancy indicator $S^a$ using a correlation operation $\otimes$, according to:

$$G_X = K_x \otimes S^a,$$

and the Z-direction gradient $G_Z$ for the cell is determined by correlating a Z-direction kernel $K_Z$ of the cell with the preliminary occupancy indicator $S^a$ using the correlation operation $\otimes$, according to:

$$G_Z = K_z \otimes S^a.$$

(76) The method of any one of processes (55) through (75), further comprising:

determining an occupancy evidence indicator $S^b$ by determining, for each cell of the grid, an occupancy evidence parameter $s_{ij}^b$ indicating a normalized likelihood of an object being in the cell, the occupancy evidence parameter $s_{ij}^b$ being determined by imposing a saturation function $f(x)$ on gradient values $g_{ij}$ of the overall gradient G, to scale the occupancy evidence parameters $s_{ij}^b$ to have values in a range from 0 to 1, according to:

$$s_{ij}^b = f(g_{ij}/\sigma_b),$$

where $\sigma_b$ corresponds to a second steepness parameter.

(77) The method of any one of processes (55) through (76), wherein the second steepness parameter $\sigma_b$ is determined such that the occupancy evidence indicator $S^b$ has a maximum value in a range of 0.75 to 0.95.

(78) The method of any one of processes (55) through (77), wherein:
 for each cell of the grid, a state of occupancy of the cell $o(t_{n+1})$ at a time $t_{n+1}$ is free (F) or is occupied (O), wherein a free (F) cell is a cell that is not occupied by an object, and wherein an occupied (O) cell is a cell occupied by at least one object,
 in (d), the performing of the noise reduction comprises, for each cell of the grid, estimating a posterior occupancy probability $p_o(t_{n+1})$ for a time $t_{n+1}$ based on an occupancy probability $p_o(t_n)$ for the time $t_n$ and an occupancy evidence indicator $S^b(t_{n+1})$ for the time $t_{n+1}$.

(79) The method of any one of processes (55) through (78), wherein the occupancy evidence indicator $S^b(t_{n+1})$ for the time for $t_{n+1}$ is obtained from the occupancy evidence indicator $S^b$.

(80) The method of any one of processes (55) through (79), wherein, in (d), the performing of the noise reduction comprises, for each cell of the grid, representing the state of occupancy of the cell $o(t_{n+1})$ for the time $t_{n+1}$ with a plurality of multi-dimensional particles representing characteristics of portions of the cell.

(81) The method of any one of processes (55) through (80), wherein:
 each of the particles comprises a state X that changes with time,
 for each particle, the state X for the time $t_n$ comprises an X-position component x, a Z-position component z, an X-direction velocity component $v_x$, and a Z-direction velocity component $v_z$, such that $X=[x, z, v_x, v_z]$,
 the particles are associated with respective weight parameters w, and
 the particles are independent of each other.

(82) The method of any one of processes (55) through (81), wherein the estimating of the posterior occupancy probability $p_{o,t}$ for a cell $c_{ij}$ at a time t comprises estimating a probabilistic value according to:

$$p_{o,t}^{(c_{ij})}(O_t) = m_t^{(c_{ij})}(O_t) + 0.5 \cdot (1 - m_t^{(c_{ij})}(O_t) - m_t^{(c_{ij})}(F_t)),$$

where:
 m(O) represents a cell mass of a cell that is occupied by an object, and
 m(F) represents a cell mass of a cell that is not occupied by an object.

(83) The method of any one of processes (55) through (82), wherein:

$$m(O) = 2 \cdot p_{occ} - 1, \text{ if } p_{occ} \geq 0.5 \text{ else } 0,$$

$$m(F) = 1 - 2 \cdot p_{occ}, \text{ if } p_{occ} < 0.5 \text{ else } 0,$$

$p_{occ}$ is an occupancy factor selected based on a desired object characteristic, and in (d), m(O) and m(F) are provided as input to a tracker as noise-reduction parameters.

(84) The method of any one of processes (55) through (83), wherein $p_{occ}$ is selected based on a minimum dimension of an object to be tracked.

(85) The method of any one of processes (55) through (84), wherein $p_{occ}$ is determined according to:

$$p_{occ} = \begin{cases} \dfrac{0.5}{b} \times S^b, & \text{if } S^b \leq b, \text{ or} \\ \dfrac{0.5}{1-b} \times (S^b - b) + 0.5, & \text{if } S^b > b, \end{cases}$$

where b is a parameter that minimizes noise for a desired minimum dimension of an object to be tracked.

(86) The method of any one of processes (55) through (85), wherein b has a value in a range from 0.1 to 0.5.

(87) The method of any one of processes (55) through (86), wherein the minimum dimension is 10 cm.

(88) The method of any one of processes (55) through (89), further comprising:
 for each tracked object of the set of tracked objects, determining an overall velocity of the tracked object by computing an average velocity for a group of the cells of the grid occupied by the object.

(89) The method of any one of processes (55) through (88), wherein, in (c), the grid is established to be a range-based grid based on a plurality of distance ranges of the depth data of the image.

(90) The method of any one of processes (55) through (89), wherein:
 cells of the grid corresponding to a first distance range have a first area, and
 cells of the grid corresponding to a second distance range have a second area smaller than the first area.

(91) The method of any one of processes (55) through (90), wherein:
 a first portion of the point-cloud data corresponding to the first distance range has a first resolution, and
 a second portion of the point-cloud data corresponding to the second distance range has a second resolution higher than the first resolution.

(92) The method of any one of processes (55) through (91), wherein cells corresponding to a third distance range have a third area smaller than the second area.

(93) The method of any one of processes (55) through (92), wherein a third portion of the point-cloud data corresponding to the third distance range has a third resolution higher than the second resolution.

(94) The method of any one of processes (55) through (93), wherein:
 the first distance range is a close range of up to about 30 m from the vehicle,
 the second distance range is a medium range of about 30 m to about 70 m from the vehicle, and
 the third distance range is a far range of about 70 m and greater from the vehicle.

(95) The method of any one of processes (55) through (94), wherein cells of the grid corresponding to a distance range farthest from the vehicle each have an area of 50 cm×50 cm or smaller.

(96) The method of any one of processes (55) through (95), wherein:

a first portion of the point-cloud data corresponding to a first distance range has a first resolution, a second portion of the point-cloud data corresponding to a second distance range has a second resolution higher than the first resolution, and a third portion of the point-cloud data corresponding to a third distance range has a third resolution higher than the second resolution.

(97) The method of any one of processes (55) through (96), wherein:

the first resolution is in a range of 0.5 megapixels to 4 megapixels, the second resolution is in a range of 3 megapixels to 9 megapixels, and the third resolution is 8 megapixels or greater.

(98) The method of any one of processes (55) through (97), wherein:

the first resolution is in a range of 0.5 megapixels to 1.5 megapixels, the second resolution is in a range of 2 megapixels to 4 megapixels, and the third resolution is in a range of 10 megapixels to 15 megapixels.

(99) The method of any one of processes (55) through (98), wherein the occupancy evidence map comprises a BEV occupancy evidence map having:

a first resolution corresponding to the first distance range, a second resolution corresponding to the second distance range, the second resolution being higher than the first resolution, and a third resolution corresponding to the third distance range, the third resolution being higher than the second resolution.

(100) The method of any one of processes (55) through (99), wherein:

the image is a stereo image corresponding to a frame of video sequence captured by the camera sensors at the time $t_n$, and to determine relative movement of the set of tracked objects, (a) through (e) are repeated every m frames of the video sequence, where $1 \leq m \leq 100$.

(101) The method of any one of processes (55) through (100), wherein $1 \leq m \leq 50$.

(102) The method of any one of processes (55) through (101), wherein m=1, or m=5, or m=10, or m=20, or m=25.

(103) The method of any one of processes (55) through (102), wherein:

for a first portion of the point-cloud data corresponding to a first distance range, (a) through (e) are processed at a first frame rate, for a second portion of the point-cloud data corresponding to a second distance range, (a) through (e) are processed at a second frame rate lower than the first frame rate.

(104) The method of any one of processes (55) through (103), wherein, for third portion of the point-cloud data corresponding to a third distance range, (a) through (e) are processed at a third frame rate lower than the second frame rate.

(105) The method of any one of processes (55) through (104), wherein:

the second frame rate is half the first frame rate, and the third frame rate is half the second frame rate.

(106) The method of any one of processes (55) through (105), wherein edge portions of adjacent distance ranges overlap.

(107) The method of any one of processes (55) through (106), wherein:

the occupancy evidence map comprises a first region corresponding to the first distance range, a second region corresponding to the second distance range, and a third region corresponding to third distance range, and the occupancy evidence map is outputted at a first update rate, with the first region comprising data updated at the first update rate, with the second region comprising data updated at a second update rate lower than the first update rate, and with the third region comprising data updated at a third update rate lower than the second update rate.

(108) The method of any one of processes (55) through (107), wherein:

the first update rate is in a range from 40 Hz to 45 Hz, the second update rate is in a range from 10 Hz to 15 Hz, and the third update rate is in a range from 1 Hz to 5 Hz.

The example methods described above may be performed using a non-transitory computer-readable storage medium storing computer-executable code executable by one or more computer processors.

REFERENCES

[1] K. Toyama and A. Blake, "Probabilistic tracking in a metric space," in *Proceedings Eighth IEEE International Conference on Computer Vision. ICCV* 2001, vol. 2. IEEE, 2001, pp. 50-57.

[2] M. D. Breitenstein, F. Reichlin, B. Leibe, E. Koller-Meier, and L. Van Gool, "Robust tracking-by-detection using a detector confidence particle filter," in 2009 *IEEE 12th International Conference on Computer Vision*. IEEE, 2009, pp. 1515-1522.

[3] B. Yan, H. Peng, J. Fu, D. Wang, and H. Lu, "Learning spatio-temporal transformer for visual tracking," in *Proceedings of the IEEE/CVF international conference on computer vision*, 2021, pp. 10 448-10 457.

[4] N. Owano, "Mercedes-Benz S-Class stability system uses sensors, stereo camera (w/Video)," 2013 phys.org. [Online]. Available: https://phys.org/news/2013-09-mercedes-benz-s-class-stability-sensors-stereo.html.

[5] "Tesla Vision Update: Replacing Ultrasonic Sensors with Tesla Vision," 2023 Tesla. [Online]. Available: https://www.tesla.com/support/transitioning-tesla-vision.

[6] "EyeSight Driver Assist Technology," 2022 Subaru. [Online]. Available: https://www.subaru.com/eyesight.html.

[7] "Sobel derivatives," 2017. [Online]. Available: https://docs.opencv.org/3.4/d2/d2c/tutorial_sobel_derivatives.html.

[8] D. Nuss, S. Reuter, M. Thom, T. Yuan, G. Krehl, M. Maile, A. Gern, and K. Dietmayer, "A random finite set approach for dynamic occupancy grid maps with real-time application," *The International Journal of Robotics Research*, vol. 37, no. 8, pp. 841-866, 2018.

[9] "Contours," 2017. [Online]. Available: https://docs.opencv.org/3.4/d4/d73/tutorial_py_contours_begin.html.

CONCLUSION

It should be understood that various alterations, modifications, and improvements may be made to the structures, configurations, and methods discussed above, and are intended to be within the spirit and scope of the invention disclosed herein. Further, although advantages of the present invention are indicated, it should be appreciated that not every embodiment of the invention will include every described advantage. Some embodiments may not implement any features described as advantageous herein. Accordingly, the foregoing description and attached drawings are by way of example only.

It should be understood that some aspects of the present technology may be embodied as one or more methods, and acts performed as part of a method of the present technology may be ordered in any suitable way. Accordingly, embodiments may be constructed in which acts are performed in an order different than shown and/or described, which may include performing some acts simultaneously, even though shown and/or described as sequential acts in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the description and the claims to modify an element does not by itself connote any priority, precedence, or order of one element over another, or the temporal order in which acts of a method are performed, but are used merely as labels to distinguish one element or act having a certain name from another element or act having a same name (but for use of the ordinal term) to distinguish the elements or acts.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the phrase "equal" or "the same" in reference to two values (e.g., distances, widths, etc.) means that two values are the same within manufacturing tolerances. Thus, two values being equal, or the same, may mean that the two values are different from one another by +5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B" when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. Use of terms such as "including," "comprising," "comprised of," "having," "containing," and "involving," and variations thereof herein, is meant to encompass the items listed thereafter and equivalents thereof as well as additional items.

The terms "approximately" and "about" if used herein may be construed to mean within +20% of a target value in some embodiments, within +10% of a target value in some embodiments, within +5% of a target value in some embodiments, and within +2% of a target value in some embodiments. The terms "approximately" and "about" may equal the target value.

The term "substantially" if used herein may be construed to mean within 95% of a target value in some embodiments, within 98% of a target value in some embodiments, within 99% of a target value in some embodiments, and within 99.5% of a target value in some embodiments. In some embodiments, the term "substantially" may equal 100% of the target value.

What is claimed is:

1. A vision system for detecting and tracking objects in stereo-vision images, the system comprising:
   at least one computer processor coupled to a memory, the at least one computer processor being configured to:
   (a) obtain point-cloud data captured by stereo-vision camera sensors on a vehicle as the vehicle travels along a road surface, wherein:
      the point-cloud data comprises image data and depth data of an image captured at a time $t_n$,
      the image comprises objects imaged along an imaging direction oriented parallel to or approximately parallel to a road surface,
      the point-cloud data corresponds data of points of a point cloud P, and
      the points of the point cloud correspond to pixels of the image;
   (b) compress the point-cloud data to bird's-eye-view (BEV) data representing a view along a BEV direction oriented approximately perpendicular to the road surface, the BEV data representing the objects on a BEV plane oriented approximately parallel the road surface;

(c) establish a grid of cells for the BEV plane, wherein:
  each cell of the grid comprises occupancy data corresponding to a likelihood that at least one of the objects is present at a position corresponding to the cell,
  each cell of the grid covers a predetermined area of the BEV plane,
  the BEV plane encompasses regions at distances in a range from 1 m or less to 200 m or more from the vehicle;
(d) for each cell of the grid, determine occupancy values of the cell for the time t, and perform noise reduction by assigning weights to the cell based on predicted occupancy values of the cell for the time $t_n$ and on occupancy values of the cell for a previous time $t_{n-1}$, and
(e) output to a controller of the vehicle, in real time or nearly real time to the time $t_n$, an occupancy evidence map based on the occupancy values of the cells of the grid for the time $t_n$, the occupancy evidence map comprising a set of tracked objects of the objects in the image.

2. The system of claim 1, wherein the at least one computer processor is further configured to:
  (f1) perform a tracking update by setting the occupancy values of the cells of the grid for the time $t_n$ to be the occupancy values of the cells of the grid at the previous the time $t_{n-1}$, and repeating (a) through (e).

3. The system of claim 1, wherein the at least one computer processor is further configured to:
  (f2) perform a tracking update by incrementing n and repeating (a) through (e).

4. The system of claim 1, wherein:
  each cell of the grid comprises a plurality of particles, and
  in (d), the weights are assigned to the particles of the cell for the time $t_n$ based on the occupancy values of the cell for the previous time $t_{n-1}$.

5. The system of claim 1, wherein, for each cell of the grid:
  the occupancy values of the cell for the time $t_n$ are associated with particles of the cell,
  the particles of the cell are independent of each other, and
  the particles of the cell each comprise multi-dimensional positional parameters and multi-dimensional velocity parameters.

6. The system of claim 1, wherein, in (c), the grid is established to be a range-based grid based on a plurality of distance ranges of the depth data of the image.

7. The system of claim 6, wherein:
  cells of the grid corresponding to a first distance range have a first area, and
  cells of the grid corresponding to a second distance range have a second area smaller than the first area.

8. The system of claim 7, wherein:
  a first portion of the point-cloud data corresponding to the first distance range has a first resolution, and
  a second portion of the point-cloud data corresponding to the second distance range has a second resolution higher than the first resolution.

9. A method of detecting and tracking objects in stereo-vision images, the method comprising:
  (a) obtaining point-cloud data captured by stereo-vision camera sensors on a vehicle as the vehicle travels along a road surface, wherein:
    the point-cloud data comprises image data and depth data of an image captured at a time $t_n$,
    the image comprises objects imaged along an imaging direction oriented parallel to or approximately parallel to a road surface,
    the point-cloud data corresponds data of points of a point cloud P, and
    the points of the point cloud correspond to pixels of the image;
  (b) compressing the point-cloud data to bird's-eye-view ("BEV") data representing a view along a BEV direction oriented approximately perpendicular to the road surface, the BEV data representing the objects on a BEV plane oriented approximately parallel the road surface;
  (c) establishing a grid of cells for the BEV plane, wherein:
    each cell of the grid comprises occupancy data corresponding to a likelihood that at least one of the objects is present at a position corresponding to the cell,
    each cell of the grid covers a predetermined area of the BEV plane,
    the BEV plane encompasses regions at distances in a range from 1 m or less to 200 m or more from the vehicle;
  (d) for each cell of the grid, determining occupancy values of the cell for the time $t_n$ and performing noise reduction by assigning weights to the cell based on predicted occupancy values of the cell for the time t, and on occupancy values of the cell for a previous time $t_{n-1}$, and
  (e) outputting to a controller of the vehicle, in real time or nearly real time to the time $t_n$, an occupancy evidence map based on the occupancy values of the cells of the grid for the time $t_n$, the occupancy evidence map comprising a set of tracked objects of the objects in the image.

10. The method of claim 9, further comprising:
  (f1) performing a tracking update by setting the occupancy values of the cells of the grid for the time $t_n$ to be the occupancy values of the cells of the grid at the previous the time $t_{n-1}$, and repeating (a) through (e).

11. The method of claim 9, further comprising:
  (f2) performing a tracking update by incrementing n and repeating (a) through (e).

12. The method of claim 9, wherein:
  each cell of the grid comprises a plurality of particles, and
  in (d), the weights are assigned to the particles of the cell for the time $t_n$ based on the occupancy values of the cell for the previous time $t_{n-1}$.

13. The method of claim 9, wherein, for each cell of the grid:
  the occupancy values of the cell for the time $t_n$ are associated with particles of the cell,
  the particles of the cell are independent of each other, and
  the particles of the cell each comprise multi-dimensional positional parameters and multi-dimensional velocity parameters.

14. The method of claim 9, wherein, in (c), the grid is established to be a range-based grid based on a plurality of distance ranges of the depth data of the image.

15. The method of claim 14, wherein:
  cells of the grid corresponding to a first distance range have a first area, and
  cells of the grid corresponding to a second distance range have a second area smaller than the first area.

16. The method of claim 15, wherein:
  a first portion of the point-cloud data corresponding to the first distance range has a first resolution, and a second portion of the point-cloud data corresponding to the second distance range has a second resolution higher than the first resolution.

17. A non-transitory computer-readable storage medium storing computer code that when executed by at least one computer processor causes the at least one computer processor to perform a method of detecting and tracking objects in stereo-vision images, where the method comprises:
  (a) obtaining point-cloud data captured by stereo-vision camera sensors on a vehicle as the vehicle travels along a road surface, wherein:
    the point-cloud data comprises image data and depth data of an image captured at a time $t_n$,
    the image comprises objects imaged along an imaging direction oriented parallel to or approximately parallel to a road surface,
    the point-cloud data corresponds data of points of a point cloud P, and
    the points of the point cloud correspond to pixels of the image;
  (b) compressing the point-cloud data to bird's-eye-view ("BEV") data representing a view along a BEV direction oriented approximately perpendicular to the road surface, the BEV data representing the objects on a BEV plane oriented approximately parallel the road surface;
  (c) establishing a grid of cells for the BEV plane, wherein:
    each cell of the grid comprises occupancy data corresponding to a likelihood that at least one of the objects is present at a position corresponding to the cell,
    each cell of the grid covers a predetermined area of the BEV plane,
    the BEV plane encompasses regions at distances in a range from 1 m or less to 200 m or more from the vehicle;
  (d) for each cell of the grid, determining occupancy values of the cell for the time $t_n$ and performing noise reduction by assigning weights to the cell based on predicted occupancy values of the cell for the time $t_n$ and on occupancy values of the cell for a previous time $t_{n-1}$, and
  (e) outputting to a controller of the vehicle, in real time or nearly real time to the time $t_n$, an occupancy evidence map based on the occupancy values of the cells of the grid for the time $t_n$, the occupancy evidence map comprising a set of tracked objects of the objects in the image.

18. The storage medium of claim 17, wherein the method further comprises:
  (f1) performing a tracking update by setting the occupancy values of the cells of the grid for the time $t_n$ to be the occupancy values of the cells of the grid at the previous the time $t_{n-1}$, and repeating (a) through (e).

19. The storage medium of claim 17, wherein the method further comprises:
  (f2) performing a tracking update by incrementing n and repeating (a) through (e).

20. The storage medium of claim 17, wherein:
  each cell of the grid comprises a plurality of particles, and
  in (d), the weights are assigned to the particles of the cell for the time $t_n$ based on the occupancy values of the cell for the previous time $t_{n-1}$.

21. The storage medium of claim 17, wherein, for each cell of the grid:
  the occupancy values of the cell for the time $t_n$ are associated with particles of the cell,
  the particles of the cell are independent of each other, and
  the particles of the cell each comprise multi-dimensional positional parameters and multi-dimensional velocity parameters.

22. The storage medium of claim 17, wherein, in (c), the grid is established to be a range-based grid based on a plurality of distance ranges of the depth data of the image.

23. The storage medium of claim 22, wherein:
  cells of the grid corresponding to a first distance range have a first area, and
  cells of the grid corresponding to a second distance range have a second area smaller than the first area.

24. The storage medium of claim 23, wherein:
  a first portion of the point-cloud data corresponding to the first distance range has a first resolution, and
  a second portion of the point-cloud data corresponding to the second distance range has a second resolution higher than the first resolution.

* * * * *